United States Patent
Krasilnikov et al.

(10) Patent No.: US 11,494,217 B1
(45) Date of Patent: Nov. 8, 2022

(54) TRANSPARENT REBOOT INTERCEPTION MIGRATION TO FACILITATE VIRTUALIZATION HOST UPDATES

(71) Applicant: Amazon Technologies, Inc., Seattle, WA (US)

(72) Inventors: Nikolay Krasilnikov, Seattle, WA (US); Alexey Gadalin, Kirkland, WA (US); Rudresh Amin, Seattle, WA (US); John Edsel Santos, Belleuve, WA (US)

(73) Assignee: Amazon Technologies, Inc., Seattle, WA (US)

(*) Notice: Subject to any disclaimer, the term of this patent is extended or adjusted under 35 U.S.C. 154(b) by 371 days.

(21) Appl. No.: 16/685,728

(22) Filed: Nov. 15, 2019

(51) Int. Cl.
*G06F 9/455* (2018.01)
*G06F 9/4401* (2018.01)

(52) U.S. Cl.
CPC ........ *G06F 9/45558* (2013.01); *G06F 9/4416* (2013.01); *G06F 2009/45595* (2013.01)

(58) Field of Classification Search
CPC ............... G06F 9/45558; G06F 9/4416; G06F 2009/45595
See application file for complete search history.

(56) References Cited

U.S. PATENT DOCUMENTS

| 5,922,072 A    | * | 7/1999  | Hutchinson ......... G06F 11/1433 713/2 |
| 2011/0289495 A1 | * | 11/2011 | Mulligan .................. G06F 8/61 717/168 |
| 2016/0274928 A1 | * | 9/2016  | Linton ................ G06F 9/45558 |
| 2017/0031602 A1 | * | 2/2017  | Xu ............................ G06F 8/62 |
| 2017/0222889 A1 | * | 8/2017  | Zong ................... H04L 41/5051 |

* cited by examiner

*Primary Examiner* — Wissam Rashid
(74) *Attorney, Agent, or Firm* — Lee & Hayes, P.C.

(57) ABSTRACT

This disclosure describes systems, devices, and techniques for migrating virtualized resources from outdated hosts during requested reboots of the virtualized resources, in order to update the outdated hosts. In an example method, a pending reboot a virtualized resource occupying a first host can be identified. At least one component of the first host may be determined to be outdated. In response to identifying the pending reboot and determining that the at least one component is outdated, the virtualized resource may be migrated to a second host. The first host may update the at least one component.

20 Claims, 11 Drawing Sheets

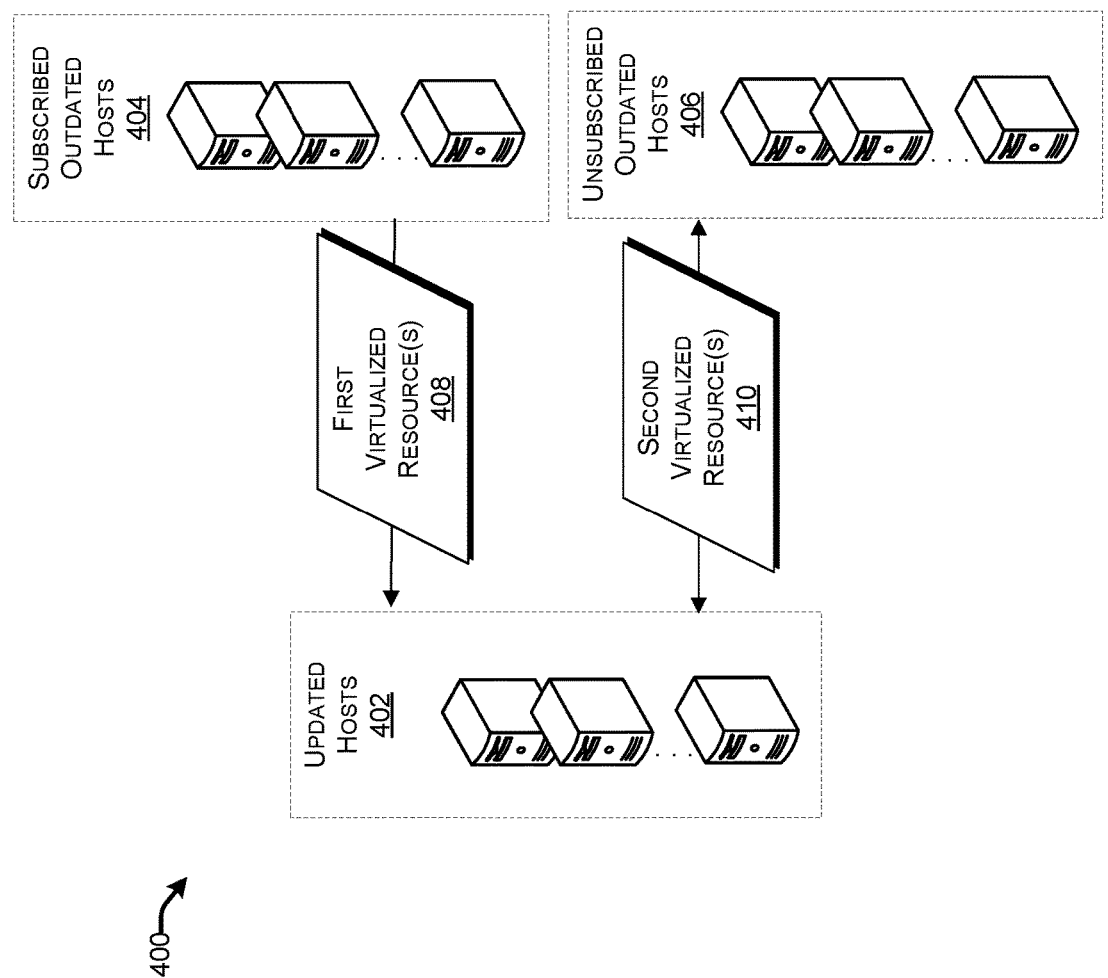

TRANSPARENT REBOOT INTERCEPTION MIGRATION TO FACILITATE VIRTUALIZATION HOST UPDATES

BACKGROUND

A cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients. In various cloud-based networks, multiple virtualized resources (also referred to as "instances") can be hosted on the same physical server. According to some examples, a single customer may have their virtualized resources distributed across multiple physical servers, and a single server may host the virtualized resources of different customers.

An example cloud-based network may include a fleet of physical servers that can host various virtualized resources. In various cases, at least one component (e.g., software, firmware, hardware, or the like) of a physical server may be in need of an update. During the update, virtualized resources hosted by the physical server may be prevented from operating. For instance, a maintenance time interval may be scheduled and a user of one of the virtualized resources may be notified, in advance, that the virtualized resource will be nonfunctional and/or inaccessible during the time interval. Accordingly, updates can significantly interfere with the functioning of virtualized resources hosted by the cloud-based network, particularly when components of a large portion of the fleet should be updated.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 illustrates an example environment showing overall movement of virtualized resources between hosts in one or more data centers.

DETAILED DESCRIPTION

Figure 1:
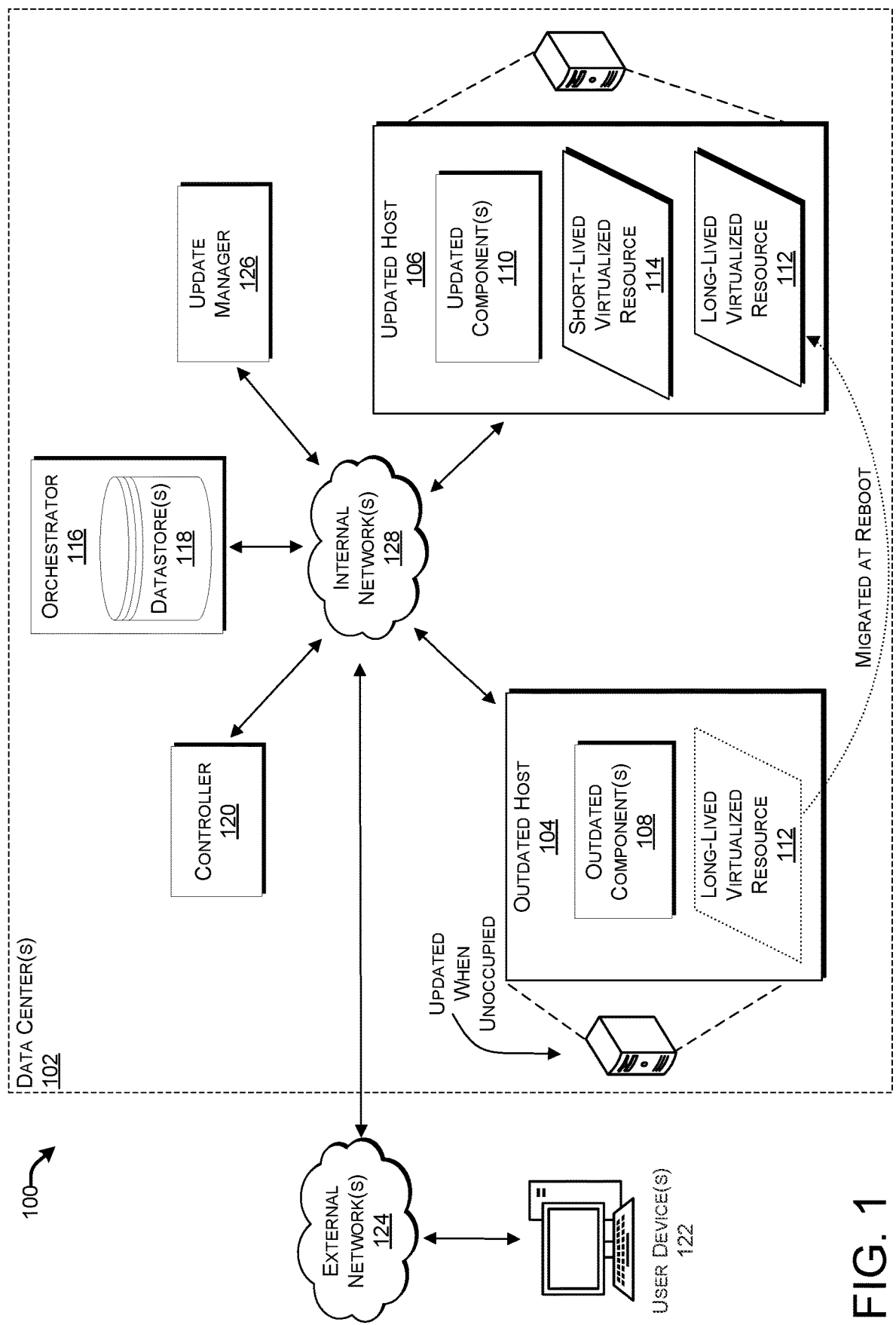
FIG. 1 illustrates an example environment for performing reboot migration to facilitate fleet updates.

This disclosure describes systems, devices, and techniques for selectively migrating virtualized resources from outdated hosts in a network to updated hosts in the network during requested reboot operations. This may be done in a transparent manner to users, so that they do not experience frustration due to workload interruptions for maintenance events. For example, a host can be marked as outdated (meaning that some hardware or software component requires an update). Typically, this would cause a notification to be sent to the customers who have virtual machines running on the outdated host, where such a notification indicates that the customer's workload will be interrupted to move the virtual machine to another host to accommodate a needed maintenance event. This can be a frustrating experience for customers, particularly if their virtual machines run on older hardware that require more frequent maintenance, or when there are frequent security updates, or with other scenarios requiring repeated maintenance notifications. The presently disclosed transparent reboot interception techniques alleviate this problem, in some embodiments, by not sending any notification to the customer and instead monitoring the virtual machine instances running on the outdated host for reboot events. When a reboot is initiated, either by the customer, by the application using the virtual machine, or by a hypervisor/virtual machine monitor running the virtual machine, the disclosed techniques are able to intercept that reboot and trigger a migration workflow to move the virtual machine to another host. In some cases, implementations can be used to opportunistically increase the likelihood that outdated hosts are emptied of virtualized resources, without requiring maintenance event notifications. Accordingly, various implementations described herein can increase the likelihood that the outdated hosts may be updated without interfering with the functionality of virtualized resources hosted by the network.

Various components of hosts (e.g., servers) in a network are updated over time. In some cases, software (e.g., applications, Operating Systems (OSs), firmware, virtualization software such as hypervisors, or the like) installed on and utilized by the hosts can be updated to improve security, efficiency, cross-compatibility, or the like. In addition, hardware in the hosts can be outdated over time, and can be replaced with updated hardware in order to improve computing performances of the hosts.

In some cases, certain software updates can be implemented on a host using Dynamic Software Updating (DSU) (also referred to as "hot patching"). However, DSU can take a significant amount of time, which can be problematic for urgent updates, such as urgent security updates. Further, a variety of updates can only be performed on a host that is unoccupied with operating virtualized resources. For example, some types of updates (e.g., hypervisor updates, hardware updates, or the like), are difficult or impossible to perform on a host in which virtualized resources are operating. Thus, in various examples, a host is emptied of virtualized resources prior to an update.

In some cases, a host can be emptied of virtualized resources for an update using scheduled migration of the virtualized resources. That is, the virtualized resources occupying the host may be selectively migrated to other hosts. For instance, upon identifying that a host is to be updated, a system can select various destination hosts for virtualized resources of the host to be updated, reserve appropriate domains within resources of the destination hosts for the virtualized resources and cause the virtualized resources to be migrated from the host to the destination hosts. In particular, the system can facilitate the update by specifically scheduling migration intervals for the virtualized resources, which may be time periods at which the virtualized resources are migrated to the destination hosts. Users associated with the virtualized resources may be informed of the scheduled migration intervals. However, scheduled migration has a number of drawbacks. Scheduled migrations can interfere with the functioning of the virtualized resources, which may be problematic to users, particularly at times when the users rely on the functionality of the virtualized resources.

To mitigate the inconvenience of scheduled migration for users, the migration intervals can be scheduled well in advance of the respective migrations (e.g., two weeks in advance of the migrations) and/or can be rescheduled based on user preferences. However, by scheduling and/or rescheduling the migration intervals in advance, the reserved resources of the destination hosts can remain unoccupied for an extended period of time until the virtualized resources are migrated, thereby underutilizing an overall capacity of the reserved resources in the network.

In various implementations of the present disclosure, virtualized resources can be selectively migrated from outdated hosts to updated hosts during requested reboots of the virtualized resources, beneficially leveraging existing reboots (that would occur regardless of required updates) without the inconvenience of notifying users of maintenance interruptions. In particular examples, a user of a particular virtualized resource may request a reboot of the virtualized resource. The reboot may be requested for a variety of reasons, e.g., to address degraded performance of the virtualized resource, to implement an update of the virtualized resource, or the like. During the requested reboot, the user may ordinarily expect the virtualized resource to be temporarily nonfunctional. In some implementations of the present disclosure, rather than rebooting and relaunching the virtualized resource on a single host, the virtualized resource may be migrated from a first host to a second host during the requested reboot. From the user's perspective, the migration of the virtualized resource may be indistinguishable from a conventional reboot, in which the virtualized resource remains on the first host. For example, although the virtualized resource may be temporarily nonfunctional during the migration, the user may also expect the virtualized resource to be temporarily nonfunctional during the reboot, such that the migration of the virtualized resource may not impact the user's experience of the reboot. Thus, the migration of the virtualized resource may be transparent to the user.

In various implementations, a virtualized resource may be migrated from a first host to a second host during reboot for other reasons. For instance, a virtualized resource may be part of a group of virtualized resources managed by the same entity (e.g., a user), and the virtualized resource may be migrated to have more desirable proximity to other hosts hosting other virtualized resources in the group (e.g., the first host may be located in a different availability zone than the third hosts, and the second host may be located in the same availability zone as the third hosts). Accordingly, latency associated with signaling between the virtualized resources in the group can be reduced, and a user experience of the entity managing the group can be improved. In some examples, the virtualized resource may be migrated in order to more efficiently distribute virtualized resources across a group of available hosts. For instance, a virtualized resource may be migrated from a first host that is hosting a relatively large number of other virtualized resources to a second host that is hosting a relatively small number of other virtualized resources.

In some cases, the migration of the virtualized resource may actually improve the user's experience of the reboot. For instance, the virtualized resource's functionality may improve by migrating the virtualized resource from the outdated host to a comparatively updated host. Thus, various implementations of the present disclosure can be used to improve the experience of individual users, as well as to facilitate fleet updates.

According to some implementations, the virtualized resource may be selectively migrated when the first host is determined to be an outdated host. For example, the first host may include at least one component (e.g., software, hardware, or the like) for which an update is available. The virtualized resource may not be migrated during reboot when the virtualized resource is hosted by an updated host. Accordingly, opportunities to update empty, outdated hosts in the network can be increased without interfering with expected virtualized resource operations.

In various examples, the virtualized resource may be selectively migrated when the virtualized resource is likely to be long-lived (e.g., an expected time before the virtualized resource is rebooted again is greater than a threshold time interval). For instance, the virtualized resource may be migrated if a time interval between a new reboot and a previous reboot is greater than a particular threshold time interval (e.g., one hour, one day, ten days, 100 days, one year, or some other time interval). In some cases, the virtualized resource may be migrated if a previous reboot frequency of the virtualized resource is less than a particular threshold frequency (e.g., once every hour, once every day, once every ten days, once every 100 days, once every year, or some other threshold frequency). These long-lived virtualized resources are more likely to occupy outdated hosts than short-lived virtualized resources, which may be likely to be rebooted relatively frequently. Thus, by selectively migrating long-lived virtualized resources, opportunities to update empty, outdated hosts in the network can be increased.

In some cases, the virtualized resource may be selectively migrated when it is flagged for reboot migration. For example, a system may flag a predetermined number and/or fraction of virtualized resources hosted by the network for reboot migration. By selectively migrating a limited fraction of virtualized resources for this service, the amount of network resources devoted to migration can be minimized. For instance, no more than 10%, 20%, 30%, or some other percentage of hosts within the fleet may be flagged for migration at a particular time.

According to various implementations, an outdated host can be emptied of virtualized resources without significantly impacting user-expected virtualized resource operations. When the host is emptied, outdated host components (e.g., software, hardware, or the like) can be updated efficiently. Various example implementations will now be described with reference to the accompanying figures.

FIG. 1 illustrates an example environment 100 for performing reboot migration to facilitate fleet updates of network-based components. The environment 100 can include one or more data centers 102. In some cases, the data center(s) 102 include multiple data centers with different power backup, such that the multiple data centers are unlikely to lose power simultaneously. In particular, the data center(s) 102 illustrated in the environment 100 may be located in a single availability zone and/or geographic region.

The data center(s) 102 can include fleet of hosts, including an outdated host 104 and an updated host 106. As used herein, the term "host" can refer to one or more physical servers. In some cases, a host can be a "shared server," which may be a single physical server configured to run multiple software virtualized resources, simultaneously. In some cases, a host can be a "bare-metal server," which may be a single physical server configured to run a single software virtualized resource at a particular time.

Each one of the outdated host 104 and the updated host 106 may include various resources by which to host virtualized resources. As used herein, the terms "resources," "computing resources," and their equivalents can refer to at least one of processing resources, memory resources, cache resources, service resources, or the like, of one or more devices. The term "processing resource," and its equivalents, may refer to the availability of at least a portion of one or more physical processors (e.g., Central Processing Units (CPUs)) to process data. The terms "memory resource," "storage resource, and their equivalents, may refer to the availability of at least a portion of one or more physical memory systems (e.g., Random Access Memory (RAM)) to store data. The term "cache resource," and its equivalents, can refer to the availability of a capacity in a RAM and/or in-memory engine to cache data at least temporarily. The term "service resource," and its equivalents, may refer to the availability of one or more services hosted by a physical server to perform requested operations. In various implementations described herein, the term "capacity" can refer to an amount of one or more resources. For instance, a capacity of a processing resource can be in units of Gigahertz (GHz), a capacity of a memory resource can be in units of Gigabytes (GB), or the like. In some multitenancy examples, a first capacity of a resource (e.g., a memory resource) may be allocated to a first virtualized resource and a second capacity of the resource may be allocated to a second virtualized resource, wherein a total capacity of the resource may be at least as large as a combination (e.g., a sum) of the first capacity and the second capacity. The term "available capacity," and its equivalents, may refer to an amount of unused or available resources within a particular host.

The outdated host 104 may include one or more outdated components 108. In some cases, the outdated component(s) 108 can include one or more outdated resources. In various implementations described herein, the term "outdated component," and its equivalents, may refer to software and/or hardware of a host for which an update is available. In some cases, an outdated component may further be defined as software and/or hardware whose last update has greater than a threshold age (e.g., one day, ten days, 100 days, one year, or another age) and/or whose last update occurred outside of a threshold time period (e.g., one day, ten days, 100 days, one year, or some other time period). The term "outdated host" may refer to a host comprising at least one outdated component.

The updated host 106 may include one or more updated components 110. In some cases, the updated component(s) 110 may include one or more updated resources. As used herein, the term "updated component," and its equivalents, can refer to software and/or hardware that has been updated with a most recent available update for that component. In some cases, an updated component may be software and/or hardware whose most recent update has less than a threshold age (e.g., one day, ten days, 100 days, one year, or another age) and/or was installed within a predetermined time period (e.g., within the past day, ten days, 100 days, one year, or some other time period). In some cases, an updated component can be a component that includes a most recent available update for that component. As used herein, the term "updated host" may refer to a host with at least one updated component.

The outdated host 104 may host a long-lived virtualized resource 112. The long-lived virtualized resource 112 may occupy at least a portion of one or more resources of the outdated host 104. For example, the long-lived virtualized resource 112 may be associated with data stored in at least one memory resource of the outdated host 104. In some cases, the long-lived virtualized resource 112 may utilize at least one processing resource of the outdated host 104 to process data. As used herein, the term "virtualized resource" can refer to software and/or data that can be hosted by a host device, such as a server. In various examples, a single virtualized resource may be associated with a single user or entity (e.g., a corporation, a business, a government agency, a non-profit, etc.), a single user or entity account, or group of users or entities. For the purposes of this discussion, the terms "user" and "entity" can be used interchangeably throughout this disclosure. In some cases, a virtualized resource can be hosted by multiple physical servers, simultaneously. As used herein, the term "long-lived virtualized resource," and its equivalents, can refer to a virtualized resource having a predicted lifetime of greater than a threshold period of time (e.g., one day, ten days, 100 days, one year, or another time interval). As used herein, the term "lifetime," and its equivalents, can refer to a period of time between consecutive reboots and/or restarts. A virtualized resource's predicted lifetime can be derived based on previously observed reboot trends of the virtualized resource. For example, a long-lived virtualized resource may be defined as a virtualized resource that has been rebooted less than a threshold frequency (e.g., once every day, once every ten days, once every 100 days, once every year, or another frequency) within a particular time interval (e.g., the past one day, ten days, 100 days, one year, or another time interval). In some instances, a long-lived virtualized resource may be defined as a virtualized resource that whose last requested reboot occurred before or during a threshold time (e.g., one day, ten days, 100 days, one year, or another time interval ago).

In various implementations, the updated host 106 may host a short-lived virtualized resource 114. The short-lived virtualized resource 114 may occupy at least a portion of one or more resources of the outdated host 104. For example, the short-lived virtualized resource 114 may be associated with data stored in at least one memory resource of the updated host 106. In some cases, the short-lived virtualized resource 114 may utilize at least one processing resource of the outdated host 104 to process data. As used herein, the term "short-lived virtualized resource," and its equivalents, can refer to a virtualized resource having a predicted lifetime of no more than a threshold period of time (e.g., one day, ten days, 100 days, one year, or another time interval) before being rebooted. For example, a short-lived virtualized resource may be defined as a virtualized resource that has been rebooted greater than a threshold frequency (e.g., once every day, once every ten days, once every 100 days, once every year, or another frequency) within a particular time interval (e.g., one day, ten days, 100 days, one year, or another time interval). In some instances, a short-lived virtualized resource may be defined as a virtualized resource that whose last requested reboot occurred after a threshold time (e.g., one day, ten days, 100 days, one year, or another time interval ago).

An orchestrator 116 may track various information about at least one of the outdated host 104, the updated host 106, the outdated component(s) 108, the updated component(s) 110, the long-lived virtualized resource 112, or the short-lived virtualized resource 114, which the orchestrator 116 may store in one or more datastores 118. Based on the information, the orchestrator 116 may at least partially control migration of virtualized resources between various hosts within the data center(s) 102, such as migration of the long-lived virtualized resource 112 and/or the short-lived virtualized resource 114 between the outdated host 104 and the updated host 106. The orchestrator 116 may be implemented and/or hosted by one or more physical servers within the data center(s) 102.

The data center(s) 102 may further include a controller 120. In some implementations, the controller 120 may be part of the orchestrator 116. The controller 120 may handle at least some control plane signaling within the data center(s) 102. The controller 120 may be configured to trigger and/or identify the reboot of a virtualized resource hosted by the data center(s), such as the long-lived virtualized resource 112 and/or the short-lived virtualized resource 114. In some cases, the controller 120 may include at least one control plane device configured to implement routing of data plane packets between various devices within the data center(s) 102, such as the outdated host 104 and/or the updated host 106. The controller 120 can trigger the reboot of a virtualized resource, such as the long-lived virtualized resource 112 or the short-lived virtualized resource 114, in response to receiving a message indicating that the reboot has been requested. For instance, one or more user devices 122 may transmit a request to initiate the reboot to the data center(s) 102 via one or more external networks 124, and the controller 120 may identify the reboot based on the request received by the data center(s) 102. The external network(s) 124 may include one or more networks that connect the user device(s) 122 to data center(s) 102. For example, the external network(s) 124 may include at least one Wide Area Network (WAN), such as the Internet. The controller 120 may communicate with the orchestrator 116 via control plane interfaces within the data center(s) 102.

The data center(s) 102 may also include an update manager 126. The update manager 126 may be configured to facilitate updates of outdated hosts, such as the outdated host 104. According to some implementations, the update manager 126 may be configured to store and/or transmit data associated with software updates to various elements within the data center(s) 102. For instance, the update manager 126 may selectively transmit data associated with a software update to a host (e.g., the outdated host 104) in response to receiving, from the orchestrator 116, an instruction to update the host. In some cases, at least two of the orchestrator 116, the controller 120, and the update manager 126 may be hosted by at least one physical server in the data center(s) 102. For instance, the orchestrator 116 and the update manager 126 may be implemented by the same device.

Various elements within the data center(s) 102 (e.g., the outdated host 104, the updated host 106, the orchestrator 116, the controller 120, and the update manager 126) may be communicatively connected to each other via one or more internal networks 126. In addition, the external network(s) 124 may be connected to the internal network(s) 128. In some cases, at least one firewall or security protocol can govern communications between the external network(s) 124 and the internal network(s) 128. The internal network(s) 128 can include any number of nodes and/or interfaces configured to transmit data between various devices in the data center(s) 102. A node in the internal network(s) 128 may include a router, switch, or other component configured to relay data between multiple interfaces in the internal network(s) 128. An interface in the internal network(s) 128 may include a wired communication interface, such as an optical-fiber interface, that can be used to transmit data between nodes and/or at least one of the outdated host 104, the updated host 106, the orchestrator 116, the controller 120, or the update manager 126. The internal network(s) 128 may include at least one Local Area Network (LAN). For instance, each data center within the data center(s) 102 may include a respective LAN that interconnects devices within the data center. In particular implementations, the internal network(s) 128 include at least one optical-fiber network that is capable of high-speed data transfer between elements within the data center(s) 102.

In various implementations, a reboot of the long-lived virtualized resource 112 may be triggered. As used herein, the term "reboot" may refer to a process by which operations of a functional entity (e.g., hardware, a software instance, or the like) are stopped and then restarted again. In some cases, a user logged onto a user account associated with the long-lived virtualized resource 112 may request the reboot. In some cases, a request for the reboot may be received in the data center(s) 102 by the controller 120 via control-plane signaling. In some instances, the request for the reboot may be received directly by the host that is hosting the long-lived virtualized resource 112, such as the outdated host 104. In some examples, the reboot may be triggered automatically in response to one or more events. For instance, the outdated host 104 may automatically trigger the reboot in response to identifying that the long-lived virtualized resource 112 has crashed. In various implementations, the outdated host 104 may recognize that the long-lived virtualized resource 112 will be rebooted when a reboot of the outdated host 104, itself, is triggered. For example, a reboot of the outdated host 104 may be triggered automatically in response to a crash of a software component (e.g., operating system, firmware, hypervisor, or the like) of the outdated host 104.

The orchestrator 116 may identify that the reboot of the long-lived virtualized resource 112 has been triggered. In some cases, an Application Programming Interface (API) of the outdated host 104 may automatically transmit, to the orchestrator 116, a notification that the reboot of the long-lived virtualized resource 112 has been triggered. According to some examples, the orchestrator 116 may receive a notification that the reboot of the long-lived virtualized resource 112 has been triggered from the controller 120. In some implementations, the orchestrator 116 may cause the long-lived virtualized resource 112 to be migrated from the outdated host 104 to the updated host 106 in response to identifying that that a reboot of the long-lived virtualized resource 112 has been triggered.

In various implementations, the orchestrator 116 may confirm that the outdated host 104, the outdated component(s) 108 of the outdated host 104, and/or the long-lived virtualized resource 112 occupying the outdated host 104, satisfies one or more conditions for migration. In some cases, the orchestrator 116 may refer to the datastore(s) 118 to identify whether the long-lived virtualized resource 112 is suitable for migration during the reboot. For example, the orchestrator 116 may confirm that at least one of the long-lived virtualized resource 112 is unlikely to be rebooted frequently, the long-lived virtualized resource 112 is associated with less than a threshold amount of data in local storage (e.g., a memory resource) of the outdated host 104, the outdated host 104 is in need of an update, the outdated component(s) 108 are in need of an update, the outdated host 104 is flagged for an update, the long-lived virtualized resource 112 is flagged for migration, or the like. In some cases, the orchestrator 116 may refrain from migrating the long-lived virtualized resource 112 if one or more of the conditions is unsatisfied.

In some cases, the condition(s) for migration may be at least partly irrelevant to the update status of the outdated host 104 and/or the expected lifetime of the long-lived virtualized resource 112. According to particular examples, the orchestrator 116 may determine that the long-lived virtualized resource 112 is a part of a group of virtualized resources managed by the same entity (e.g., a user) and that the long-lived virtualized resource 112 occupies a host whose geographical location in the data center(s) 102 is relatively far away from the hosts that are hosting the other virtualized resources in the group. For instance, the orchestrator 116 may confirm that the outdated host 104 is located in a first availability zone and that one or more other hosts in which other virtualized resources in the group occupy are located in a second availability zone, the first availability zone being different than the second availability zone. The orchestrator 116 may selectively facilitate reboot migration of the long-lived virtualized resource 112 from the outdated host 104 in the first availability zone to a destination host in the second availability zone. Accordingly, latency associated with signaling between the long-lived virtualized resource 112 and other virtualized resources in the group can be reduced, and an experience of the user managing the group of virtualized resources can be improved.

In some examples, a condition for migration may be whether the long-lived virtualized resource 112 is occupying a host (e.g., the outdated host 104) that is relatively crowded with virtualized resources and/or whether there are other hosts in the data center(s) 102 that are relatively uncrowded. That is, the long-lived virtualized resource 112 may be migrated in order to more efficiently distribute virtualized resources across a group of available hosts in the data center(s) 102. For instance, the orchestrator 116 may determine to migrate the long-lived virtualized resource 112 when the outdated host 104 has less than a threshold amount of available capacity and/or is hosting greater than a threshold number of virtualized resources. In some cases, the orchestrator 116 may determine to migrate the long-lived virtualized resource 112 to a destination host (e.g., the updated host 106) when the destination host at least a threshold amount of available capacity with which to host virtualized resources and/or is hosting no more than a threshold number of virtualized resources. Accordingly, reboot migration can be used to balance the distribution of virtualized resources across hosts in the data center(s) 102.

However, if the condition(s) are satisfied, the orchestrator 116 may facilitate migration of the long-lived virtualized resource 112 to the updated host 106. In some cases, the orchestrator 116 may identify the updated host 106 according to various metrics. For instance, the orchestrator 116 may identify that the updated host 106 has been updated recently, has similar resource capabilities (e.g., memory capacity, processing capabilities, etc.) to the outdated host 104, is expected to have enough available capacity to host the long-lived virtualized resource 112, or the like. In some cases, the orchestrator 116 may ensure that a domain of one or more resources of the updated host 106 is reserved for the long-lived virtualized resource 112, prior to causing the long-lived virtualized resource 112 to migrate to the updated host 106. In various implementations, the orchestrator 116 may cause migration of the long-lived virtualized resource 112 to the updated host 106 by instructing the outdated host 104 to transfer data associated with the long-lived virtualized resource 112 to the updated host 106. The data associated with the long-lived virtualized resource 112 may be, for instance, state information (such as Complementary Metal Oxide Semiconductor (CMOS) block settings, clock settings, BIOS settings, or the like) associated with the long-lived virtualized resource 112, data held in a local storage of the outdated host 104 and/or the updated host 106, and/or any other data that can be used to run or operate the long-lived virtualized resource 112 in a host. In some cases, the data associated with the long-lived virtualized resource 112 may be transferred directly over a peer-to-peer connection between the outdated host 104 and the updated host 106. In some implementations, the data associated with the long-lived virtualized resource 112 may be relayed between the outdated host 104 and the updated host via the orchestrator 116. Once the data associated with the long-lived virtualized resource 112 has been fully transferred from the outdated host 104 to the updated host 106, the long-lived virtualized resource 112 can occupy the resource(s) of the updated host 106 and resume operations.

In some cases, the orchestrator 116 may facilitate migration of the long-lived virtualized resource 112 in stages. For instance, the orchestrator 116 may identify that the long-lived virtualized resource 112 is associated with at least a threshold amount of data (e.g., 1 MB, 1 GB, or some other amount of data) stored in a local storage of the outdated host 104. The amount of data may take a relatively long time to transfer from the outdated host 104 to the updated host 106. Accordingly, the orchestrator 116 may cause the outdated host 104 to initially transfer a minimal amount of information associated with the long-lived virtualized resource 112 (e.g., just state information associated with the long-lived virtualized resource 112) and cause the long-lived virtualized resource 112 to resume operations on one or more resources of the updated host 106 after the state information has been transferred. Meanwhile, the data in the local storage of the outdated host 104 may be transferred as the long-lived virtualized resource 112 is operating using the resource(s) of the updated host 106. If the long-lived virtualized resource 112, or some other entity, seeks to access the data that is being transferred from the local storage of the outdated host 104, the associated access requests may be routed to the outdated host 104. Accordingly, the long-lived virtualized resource 112 may continue to use the memory resources of the outdated host 104 as the data in the local storage of the outdated host 104 is transferred to the updated host 106.

In some cases, the long-lived virtualized resource 112 may confirm, to the orchestrator 116, that the long-lived virtualized resource 112 has been fully migrated to the updated host 106. Once the data associated with the long-lived virtualized resource 112 has been fully transferred to the updated host 106, the long-lived virtualized resource 112 may launch exclusively on the updated host 106. According to various implementations, upon identifying that the long-lived virtualized resource 112 has been fully migrated to the updated host 106, the orchestrator 116 may further identify that the outdated host 104 is unoccupied. For instance, the orchestrator 116 may determine that the outdated host 104 is no longer hosting any virtualized resources. In response to identifying that the outdated host 104 is unoccupied, the orchestrator 116 may notify the update manager 126 that the outdated host 104 is unoccupied and/or is ready to be updated.

The update manager 126 may facilitate an update of the outdated component(s) 108 on the outdated host 104. In some cases of a software-based update, the update manager 126 can transmit, to the outdated host 104, data associated with the update. In response to receiving the data associated with the update, the outdated host 104 may update the outdated component(s) 108. In some cases, the update manager 126 may notify a network administrator that the outdated host 104 is ready for an update. Accordingly, the administrator can physically update hardware of the outdated host 104, for instance. Upon identifying that the update is complete, the update manager 126 may inform the orchestrator 116. The orchestrator 116 may revise at least one entry in the datastore(s) 118 based on the update to the host 104 and the component(s) 108. Accordingly, the orchestrator 116 may track when an outdated host (e.g., outdated host 104) becomes an updated host.

In some implementations, a reboot of the short-lived virtualized resource 114 may be treated differently than the reboot of the long-lived virtualized resource 112. Similar to the reboot of the long-lived virtualized resource 112, the orchestrator 116 may identify that the reboot of the short-lived virtualized resource 114 has been triggered. However, upon identifying (e.g., using the datastore(s) 118) that the short-lived virtualized resource 114 is likely to be rebooted frequently and/or that the updated host 106 is up-to-date, the orchestrator 116 may refrain from causing the short-lived virtualized resource 114 to be migrated to a different host. Accordingly, the reboot of the short-lived virtualized resource 114 may proceed without migration.

In a particular example, described with reference to FIG. 1, the data center(s) 102 may include a number of outdated servers with outdated software, such as an old version of a hypervisor utilized by various servers within the data center(s). A new version of the hypervisor may be available and stored at the update manager 120 and may have a number of advantages. For instance, the new version of the hypervisor may be more effectively isolate multiple virtualized resources in a single server from each other than the old version of the hypervisor. Thus, updating the hypervisors of the outdated servers may be advantageous. However, it may be difficult to impossible to update the hypervisor of any one of the outdated servers while a virtualized resource is actively occupying and/or utilizing computing resources of the outdated server. Accordingly, each of the outdated servers may need to be evacuated of virtualized resources before the corresponding hypervisor can be updated.

The outdated host 104 illustrated in FIG. 1 may be one of the outdated servers, and the outdated component(s) 108 may include the outdated version of the hypervisor. Multiple virtualized resources, including the long-lived virtualized resource 112, may be occupying and/or utilizing computing resources of the outdated host 104 when the new version of the hypervisor becomes available. These multiple virtualized resources hosted by the outdated host 104 may be managed by the old version of the hypervisor, for instance. Accordingly, in order to update the outdated hypervisor of the outdated host 104, the multiple virtualized resources occupying and/or utilizing the computing resources of the outdated host 104 may be migrated (i.e., moved) from the outdated host 104 to other hosts within the data center(s) 102. Once the outdated host 104 is no longer hosting any virtualized resources, the update manager 126 can provide the outdated host 104 with the data the outdated host 104 can use to update the hypervisor according to the new version.

Each one of the multiple virtualized resources, however, may be temporarily nonfunctional as it is transferred from the outdated host 104 to another host within the data center(s) 102. That is, migrating a virtualized resource can temporarily prevent the virtualized resource from processing, accessing, or storing data. For instance, if the virtualized resource is an application, the application may be nonfunctional to users as the virtualized resource is migrated between hosts.

Rather than interrupting the expected operations of the multiple virtualized resources hosted by the outdated host 104, the orchestrator 116 may selectively migrate the virtualized resources from the outdated host 104 during requested reboots of the virtualized resources. Because a user may expect the reboot to interrupt the ongoing operations of a virtualized resource, migrating the virtualized resource during the reboot may not impact the operations of the virtualized resource any more than the reboot. As a result, the experience of users associated with the virtualized resources hosted by the outdated host 104 may be enhanced as the outdated host 104 is emptied in preparation for the update to the hypervisor.

In particular, some virtualized resources are less likely to be rebooted than other virtualized resources. The long-lived virtualized resource 112, for instance, may be an application that has been continuously running on the outdated host 104 for over a month, thereby preventing the outdated host 104 from being updated for over a month. To balance the interests of utilizing the computing resources of the outdated host 104 as much as possible, but to also facilitate the update of the outdated host 104, the orchestrator 116 may specifically cause the long-lived virtualized resource 112 to migrate from the outdated host 104 when it is rebooted, even though the orchestrator 116 may refrain from specifically causing other, more frequently rebooted virtualized resources of the outdated host 104, from migrating. In some cases, the orchestrator 116 may at least temporarily allow short-lived virtualized resources, like the short-lived virtualized resource 114, to migrate onto the outdated host 104, because the short-lived virtualized resource 114 may be highly likely to be rebooted and opportunistically migrated from the outdated host 104 within a relatively short time period, during which more long-lived virtualized resources (such as the long-lived virtualized resource 112) hosted by the outdated host 104 may be migrated.

The orchestrator 116 may further ensure that at least some of the virtualized resources migrated from the outdated host 104 are placed on updated hosts, such as the updated host 106. The updated host 106 may be running the new version of the hypervisor. Accordingly, even if a relatively long-lived virtualized resource, such as the long-lived virtualized resource 112 is unlikely to move from the updated host 106 shortly after its migration from the outdated host 104, the updated host 106 may not require an update for a while.

According to various implementations of the present disclosure, the environment 100 can be used to efficiently utilize network resources and to efficiently update outdated hosts within a fleet of hosts. In addition, because virtualized resources can be migrated from outdated hosts during requested reboots, the updates can be performed without initiating unnecessary interruptions to the functionality of virtualized resources hosted by the fleet.

Figure 2:
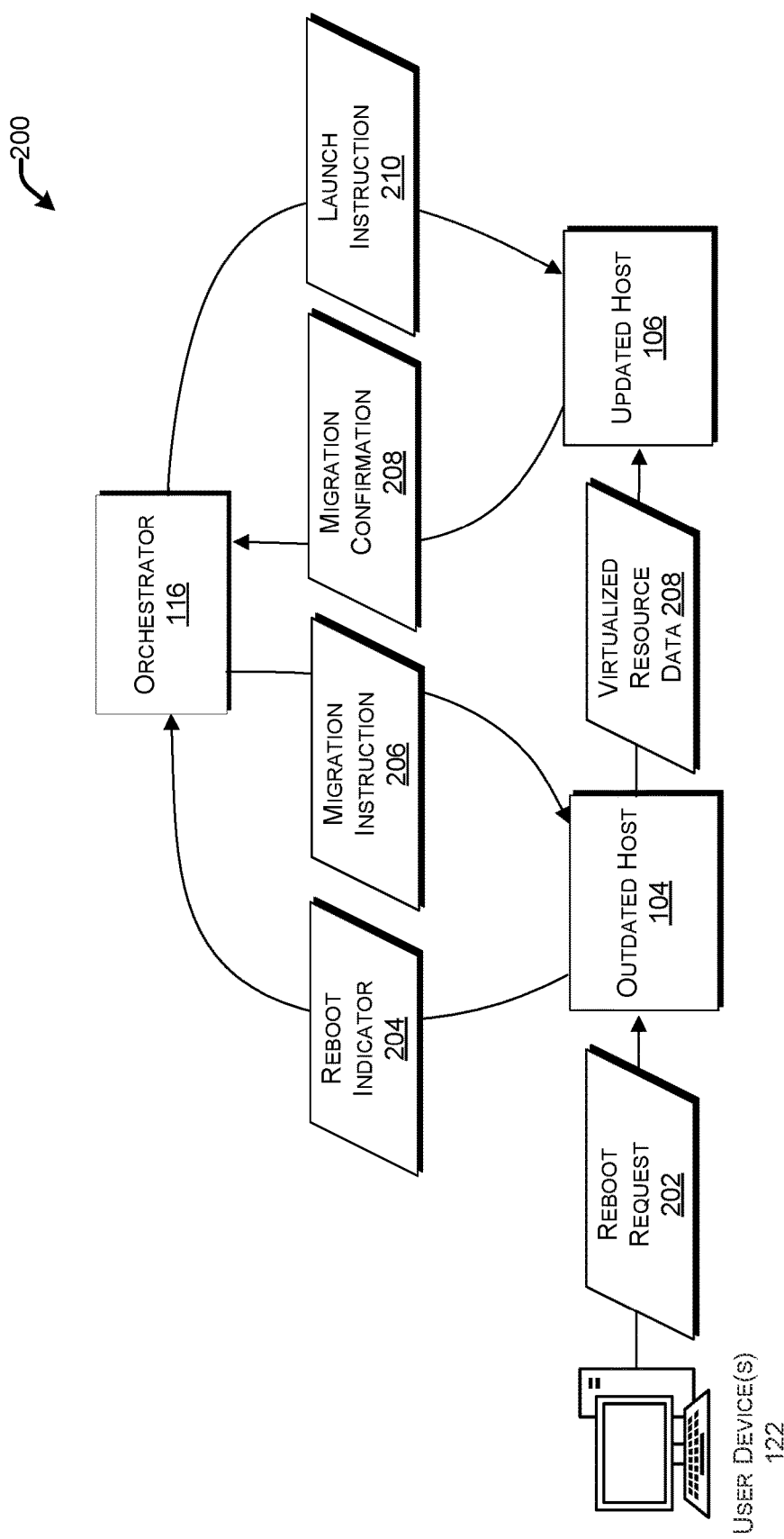
FIG. 2 illustrates example signaling for performing reboot migration to facilitate fleet updates.
Figure 3:
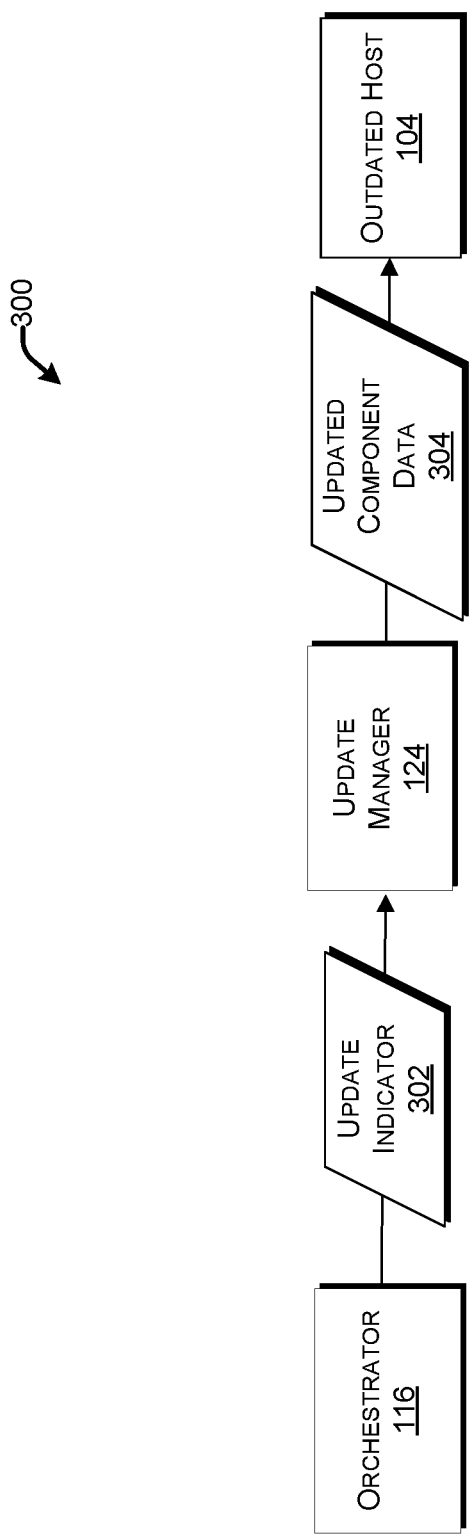
FIG. 3 illustrates example signaling for updating a host in a cloud-based network.

FIGS. 2 and 3 illustrate examples of signaling between various elements of the environment 100 described above with reference to FIG. 1. The examples of signaling may be the transfer of any type of data (e.g., data plane, user plane, control plane, or a combination thereof) between various elements of the environment 100. In some cases, data can be transferred in the form of one or more data packets and/or datagrams, such as Internet Protocol (IP) (e.g., IPv4 or IPv6) packets.

FIG. 2 illustrates example signaling 200 for performing reboot migration to facilitate fleet updates. As illustrated, the signaling 200 may be between the outdated host 104, the updated host 106, the orchestrator 116, and the user device(s) 122 described above with reference to FIG. 1. Although not illustrated in FIG. 2, the signaling 200 can include transmissions over one or more internal networks (e.g., the internal network(s) 128 described above with reference to FIG. 1) in one or more data centers (e.g., the data center(s) 102 described above with reference to FIG. 1).

As illustrated in FIG. 2, the outdated host 104 may transmit a reboot indicator 204 to the orchestrator 116. In various examples, the outdated host 104 may identify that a reboot of a particular virtualized resource (e.g., the long-lived virtualized resource 112 described above with reference to FIG. 1) occupying the outdated host 104 has been requested. For instance, the outdated host 104 may receive a reboot request 202 from the user device(s) 122, which may be connected to the data center(s) via one or more external networks (e.g., the external network(s) 124 described above with reference to FIG. 1). In some cases, the reboot request 202 may be relayed from the user device by a controller (e.g., the controller 120 described above with reference to FIG. 1) handling control plane signaling, or the like.

In response to receiving the reboot request 202, the outdated host 104 may generate and transmit the reboot indicator 204 to the orchestrator 116. For example, a function of an API of the outdated host 104 may be activated and cause the outdated host 104 to transmit the reboot indicator 204 to the orchestrator 116 in response to receiving the reboot request 202. In some cases, the function may be at least temporarily activated in the outdated host 104. For example, at a later time, the outdated host 104 may refrain from transmitting a reboot indicator in response to receiving a request to reboot a virtualized resource hosted by the outdated host 104. According to some implementations, the orchestrator 116 may selectively cause the function of the outdated host 104 to be activated when the orchestrator 116 identifies that the outdated host 104 is flagged for an update. For instance, the orchestrator 116 may transmit, to the outdated host 104, an instruction to activate or deactivate the function.

The reboot indicator 204 may include at least one of an identifier of the outdated host 104 (e.g., an IP address of the outdated host, a host ID of the outdated host 104, etc.), an identifier of the particular virtualized resource being rebooted (e.g., an IP address of the particular virtualized resource, a virtualized resource ID of the particular virtualized resource, a domain ID of at least one resource occupied by the particular virtualized resource, etc.), or the like. In various implementations, the orchestrator 116 may utilize information in the reboot indicator 204 to identify whether the particular virtualized resource should be migrated during its reboot.

In some cases, the orchestrator 116 may use the identifier of the outdated host 104 to determine whether the outdated host 104 is in need of an update. For example, the orchestrator 116 may access a datastore (e.g., stored locally or elsewhere in the data center(s)) storing an entry that indicates that at least one of the existence of an update that is available for the outdated host 104, a most recent update of the outdated host 104 occurred before or during a threshold time (e.g., at least a day, at least ten days, at least 100 days, at least one year, or some other time period ago), or the like. According to various implementations, the orchestrator 116 may determine to migrate the particular virtualized resource in response to identifying that the outdated host 104 is in need of an update.

In some implementations, the orchestrator 116 may use the identifier of the particular virtualized resource to identify whether the particular virtualized resource should be migrated during the reboot. For instance, the orchestrator 116 may determine that the particular virtualized resource should be migrated by accessing a datastore (e.g., stored locally or elsewhere in the data center(s)) storing an entry indicating that a likelihood that the particular virtualized resource will be rebooted again within a predetermined time period (e.g., the next day, the next ten days, the next 100 days, the next year, or some other time period) is less than a threshold likelihood (e.g., 50%, 75%, 90%, or some other likelihood). For example, the entry may indicate that a frequency that the particular virtualized resource has been rebooted in a past predetermined time period (e.g., one day, ten days, 100 days, one year, or some other time period) is less than a predetermined frequency (e.g., once every day, once every ten days, once every 100 days, once every year, or some other frequency). In some cases, the entry may indicate that the last reboot performed on the particular virtualized resource occurred before or during a threshold time (e.g., one day, ten days, 100 days, one year, or some other time period ago). In various implementations, the orchestrator 116 may determine to migrate the particular virtualized resource in response to identifying that the particular virtualized resource is a long-lived virtualized resource that is unlikely to be rebooted frequently in the future.

In some cases, the orchestrator 116 may confirm whether the particular virtualized resource is suitable for migration. According to various implementations, the orchestrator 116 may confirm that the particular virtualized resource is associated with less than a threshold amount of data (e.g., less than 1 MB, less than 1 GB, or some other amount of data) in local storage of the outdated host 104. For instance, the orchestrator 116 may access a datastore (e.g., stored locally or elsewhere in the data center(s) storing an entry indicating that the virtualized resource is associated with less than the threshold amount of data, the reboot indicator 204 itself may indicate that the virtualized resource is associated with less than the threshold amount of data, or the like.

According to some cases, the orchestrator 116 may identify a destination of the particular virtualized resource. That is, the orchestrator 116 may identify that the particular virtualized resource should be migrated to the updated host 106. In some cases, the orchestrator 116 may select the updated host 106 from a list of hosts in a datastore (e.g., stored locally or elsewhere in the data center(s)) indicating that the updated host 106 is up-to-date and/or has enough free capacity to host the particular virtualized resource. For example, the orchestrator 116 may identify that the updated host 106 is up-to-date by identifying at least one of an absence of available updates for the updated host 106, a previous update of the updated host 106 was performed after a threshold time (e.g., one day, ten days, 100 days, one year, or some other time period ago), or the like. In some cases, the orchestrator 116 may specifically select the updated host 106 among hosts with similar capabilities to the outdated host 104, such as similar memory capacity, similar processing capacity, the same operating system, the same vendor, or the like.

Upon determining to migrate the particular virtualized resource, the orchestrator 116 may transmit a migration instruction 206 to the outdated host 104. In various cases, the migration instruction 206 may direct the outdated host 104 to transfer virtualized resource data 208 associated with the particular virtualized resource to the updated host 106. In some examples, the migration instruction 206 may include at least one of an identifier of the particular virtualized resource, an identifier of the domain of the outdated host 104 in which the particular virtualized resource occupies, an identifier of the updated host 106 (e.g., an IP address of the updated host 106, a host ID of the updated host 106, or the like), an identifier of an unoccupied domain in the updated host 106, or the like.

According to some cases, the migration instruction 206 may direct the outdated host 104 to directly transfer the virtualized resource data 208 to the updated host 106. For example, the migration instruction 206 may direct the outdated host 104 to establish a peer-to-peer connection with the updated host 106. In various cases, the outdated host 104 may transfer the virtualized resource data 208 to the updated host 106 over the peer-to-peer connection.

In some implementations, the migration instruction 206 may direct the outdated host 104 to transfer the virtualized resource data 208 to the orchestrator 116, which may forward the virtualized resource data 208 to the updated host 106. That is, the orchestrator 116 may act as a mediator of the transfer of the virtualized resource data 208 from the outdated host 104 to the updated host 106.

In various implementations, the outdated host 104 may transmit virtualized resource data 208 to the updated host 106. The virtualized resource data 208 may include various data associated with the particular virtualized resource, such as state information of the particular virtualized resource, data in local storage of the outdated host 104 that is associated with the particular virtualized resource, or the like. Upon the transfer of the virtualized resource data 208 from the outdated host 104 to the updated host 106, the particular virtualized resource can resume operations on the updated host 106.

In example implementations, the updated host 106 may transmit, to the orchestrator 116, a migration confirmation 208 in response to determining that the virtualized resource data 208 has been fully transferred to the updated host 106.

According to some cases, the orchestrator 116 may perform additional functionality within the data center(s) to enable the virtualized resource to launch on the updated host 106. For instance, the orchestrator 116 may instruct one or more routers in the internal network(s) of the data center(s) to update routing tables, such that data destined for the virtualized resource is transmitted to the updated host 106, rather than the updated host 104.

The orchestrator 116 may transmit, to the updated host 106, a launch instruction 210. Once the updated host 106 receives the launch instruction 210, the virtualized resource may launch exclusively on the updated host 106. Once the virtualized resource launches on the updated host 106, the virtualized resource may proceed to operate on the updated host 106.

FIG. 3 illustrates example signaling 300 for updating a host in a cloud-based network. As illustrated in FIG. 3, the signaling 300 may be between the outdated host 104, the orchestrator 116, and the update manager 126, described above with reference to FIG. 1 and/or FIG. 2. Although not illustrated in FIG. 3, the signaling 300 can include transmissions over one or more internal networks (e.g., the internal network(s) 128 described above with reference to FIG. 1) in one or more data centers (e.g., the data center(s) 102 described above with reference to FIG. 1).

According to various implementations, the orchestrator 116 may identify that the outdated host 104 is unoccupied. For instance, the orchestrator 116 may access a datastore (e.g., stored locally and/or elsewhere in the data center(s)) including at least one entry indicating that the outdated host 104 is not hosting any virtualized resources. Accordingly, the orchestrator 116 may determine that the outdated host 104 can be updated without interfering with the functionality of any virtualized resources operating in the data center(s).

The orchestrator 116 may transmit an update indicator 302 to the update manager 126. The update indicator 302 may include at least one of an identifier of the outdated host 104 (e.g., an IP address of the outdated host 104, a host ID of the outdated host 104, etc.), an identifier of at least one component of the outdated host 104 that is in need of an update (e.g., an identifier of software running on the outdated host 104 that is in need of an update, an identifier of hardware utilized by the outdated host 104 that is in need of an update, etc.), or the like.

The update indicator 302 may cause the update manager 126 to update the outdated host 104. The update manager 126 may transmit updated component data 304 to the outdated host 104. In various implementations, the updated component data 304 may include a software update, a firmware update, or the like.

Upon receiving the updated component data 304, the outdated host 104 may at least partially update its outdated component(s). For example, if the outdated component(s) include outdated software (e.g., an outdated OS, outdated firmware, an outdated hypervisor, or the like), the updated component data 304 may include updated software enabling the outdated host 104 to update the outdated software. In some cases, if the outdated component(s) include outdated hardware (e.g., an outdated Central Processing Unit (CPU), an outdated memory device, or the like), the updated component data 304 may include updated firmware enabling the outdated host 104 to run updated hardware when the outdated hardware is replaced by the updated hardware. Although not illustrated in FIG. 3, in some cases, the update manager 126 may further output, to a system administrator and/or maintenance expert, an indication that the outdated hardware of the outdated host 104 should be replaced.

FIG. 4 illustrates an example environment 400 showing overall movement of virtualized resources between hosts in one or more data centers. In some cases, the data center(s) can include the data center(s) 102 described above with reference to FIG. 4.

As illustrated in FIG. 4, the environment 400 can include at least three sets of hosts: updated hosts 402, subscribed outdated hosts 404, and unsubscribed outdated hosts 406. The updated hosts 402 may include one or more hosts for which at least one update is unavailable, one or more hosts that have been previously updated within a particular time frame, or the like. The subscribed outdated hosts 404 and the unsubscribed outdated hosts 406 may include one or more hosts for which at least one update is available, one or more hosts that have been last updated before or during a threshold time, or the like. The subscribed outdated hosts 404 may include hosts flagged for an update at a particular time, whereas the unsubscribed outdated hosts 406 may include hosts that are not flagged for an update at the particular time. For example, an orchestrator (e.g., the orchestrator 116 described above with reference to FIGS. 1 to 3) can track and/or flag the subscribed outdated hosts 404.

According to various implementations, one or more first virtualized resources 408 may be migrated from the subscribed outdated hosts 404 to the updated hosts 402. In some examples, the first virtualized resource(s) 408 may include one or more long-lived virtualized resources. For instance, each one of the first virtualized resource(s) 408 may be a long-lived virtualized resource. In some cases, virtualized resources may not be migrated to the subscribed outdated hosts 404. For example, long-lived virtualized resources may not be migrated to the subscribed outdated hosts 404. As a result of this overall movement of virtualized resources throughout the environment 400, the chance that any one of the subscribed outdated hosts 404 is emptied can increase. Accordingly, the chance that one of the subscribed outdated hosts 404 can be updated without interfering with the functioning of virtualized resources in the environment 400 may also increase.

On the other hand, one or more second virtualized resources 410 may be migrated between the updated hosts 402 and the unsubscribed outdated hosts 406. For instance, the unsubscribed outdated hosts 406 may not be actively vacated in the environment 400. Accordingly, the components provided by the unsubscribed outdated hosts 406 can be utilized efficiently while the subscribed outdated hosts 404 are being emptied and/or updated. The second virtualized resource(s) 410 may include one or more short-lived virtualized resources, one or more long-lived virtualized resources, or a combination thereof. Although FIG. 4 depicts that various virtualized resources are migrated between hosts in the environment 400 during reboots, in some cases, a virtualized resource may be rebooted and relaunched on the same host.

Figure 5A:
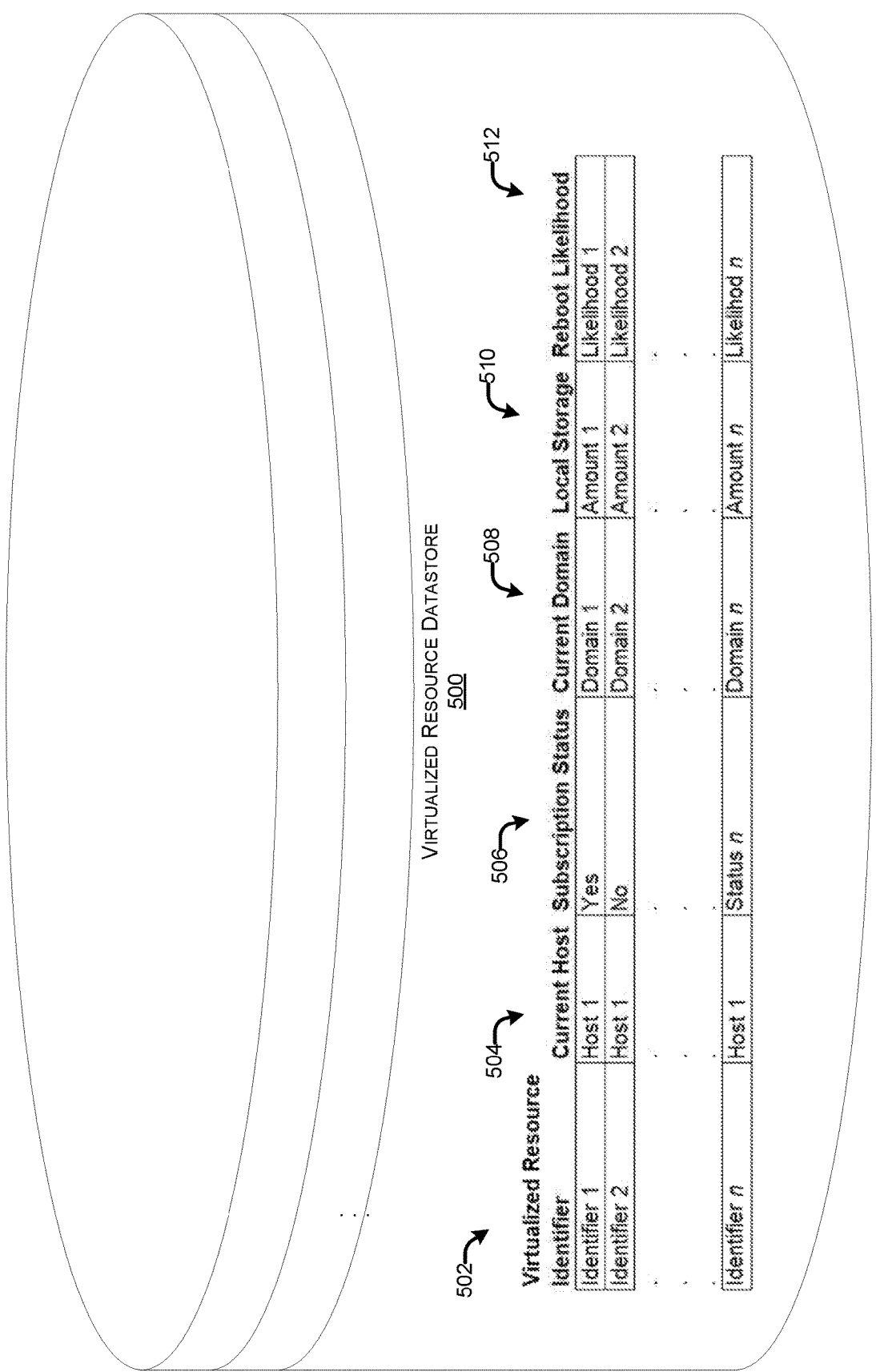
FIG. 5A illustrates an example of a virtualized resource datastore, which can be used to track virtualized resources in one or more data centers.

FIG. 5A illustrates an example of a virtualized resource datastore 500. In various implementations, the virtualized resource datastore 500 can be a database stored locally in and/or accessed by an orchestrator, such as the orchestrator 116 described above with reference to FIGS. 1 to 3. In some examples, the virtualized resource datastore 500 can be at least part of the datastore(s) 118 described above with reference to FIG. 1.

The virtualized resource datastore 500 can include n entries corresponding to various virtualized resources hosted in at least one data center (e.g., the data center(s) 102 described above with reference to FIG. 1), wherein n is a positive integer. Each entry can include multiple fields, such as a virtualized resource identifier field 502, a current host field 504, a subscription status field 506, a current domain field 508, a local storage field 510, and a reboot likelihood field 512.

The virtualized resource identifier field 502 may include an identifier of the virtualized resource corresponding to the entry. For instance, the virtualized resource identifier field 502 may include an IP address of the virtualized resource, a virtualized resource ID of the virtualized resource, or the like. As illustrated in FIG. 5A, one virtualized resource corresponds to "Identifier 1," and another virtualized resource corresponds to "Identifier 2."

The current host field 504 may identify a host that is currently hosting the virtualized resource. In some cases, the current host field 504 may include an IP address of the host, a host ID of the host, or the like. As illustrated in FIG. 5A, each one of the virtualized resources corresponding to "Identifier 1" to "Identifier n" is currently hosted by "Host 1." However, in various implementations, the current host field 504 may indicate a variety of different hosts in the data center(s).

The subscription status field 506 may identify whether the virtualized resource is flagged for reboot migration. In various implementations, only a partial number of virtualized resources within the data center(s) may be flagged for reboot migration at a given time, in order to limit the impact of reboot migration on infrastructure within the data center(s) at the given time. For instance, no more than 10%, 20%, 30%, or some other percentage of virtualized resources within the data center(s) may be flagged for migration at a particular time. As illustrated in FIG. 5A, the virtualized resource corresponding to "Identifier 1" may be subscribed and/or flagged for reboot migration, whereas the virtualized resource corresponding to "Identifier 2" may not be subscribed and/or flagged for reboot migration.

The current domain field 508 may indicate a domain of the host in which the virtualized resource occupies. In various examples, the current domain field 508 may indicate at least one of a container, at least one processing resource, at least one memory resource, or the like, in which the virtualized resource occupies. For instance, as illustrated in FIG. 5A, the virtualized resource corresponding to "Identifier 1" may be occupying one or more resources of "Host 1" specified according to "Domain 1," and the virtualized resource corresponding to "Identifier 1" may be occupying one or more resources of "Host 1" specified according to "Domain 2," wherein "Domain 1" and "Domain 2" may be distinct domains of "Host 1."

The local storage field 510 may specify an amount of data associated with the virtualized resource that is stored in local storage of the current host. For instance, the local storage field 510 may indicate an amount of data in units of GB. For example, "Identifier 1" may be associated with an "Amount 1" of data in local storage of "Host 1," and "Identifier 2" may be associated with an "Amount 2" of data in local storage of "Host 1."

The expected lifetime field 512 may indicate an expected time period between consecutive reboots of the corresponding virtualized resource. In some cases, the expected lifetime field 512 may at least correspond to a previous frequency at which the corresponding virtualized resource has been rebooted in the past, how recently the virtualized resource has previously been rebooted, or the like. For example, the virtualized resource corresponding to "Identifier 1" may have a "Lifetime 1" indicating a particular time period (e.g., one day) between reboots, and the virtualized resource corresponding to "Identifier 2" may have a "Lifetime 2"

indicating a particular time period (e.g., one year) between reboots. In some cases, a virtualized resource may be defined as a short-lived virtualized resource if its entry in the expected lifetime field 512 is no more than a particular threshold (e.g., 12 hours, one day, 30 days, one year, or some other time frame). According to some examples, a virtualized resource may be defined as a long-lived virtualized resource if its entry in the expected lifetime field 512 is greater than the particular threshold.

In various implementations, the virtualized resource datastore 500 can be used to identify whether to migrate a virtualized resource during a reboot procedure. For instance, the orchestrator may selectively migrate virtualized resources that are flagged for migration according to the subscription status field 506. In some implementations, the orchestrator may selectively migrate virtualized resources that are associated with less than a threshold amount of data in local storage, according to the local storage field 510. In various cases, the orchestrator may selectively migrate virtualized resources with greater than an expected lifetime, as specified by the expected lifetime field 512.

In some cases, the virtualized resource datastore 500 can be used to facilitate migration of a virtualized resource during a reboot procedure. For example, the orchestrator can utilize the identity of a virtualized resource specified in the virtualized resource identifier field 502 to identify that a particular reboot request corresponds to the virtualized resource. The orchestrator may utilize the host specified in the current host field 504 and/or the domain specified in the current domain field 508 to identify and/or instruct the host (e.g., "Host 1") to migrate a particular virtualized resource.

Figure 5B:
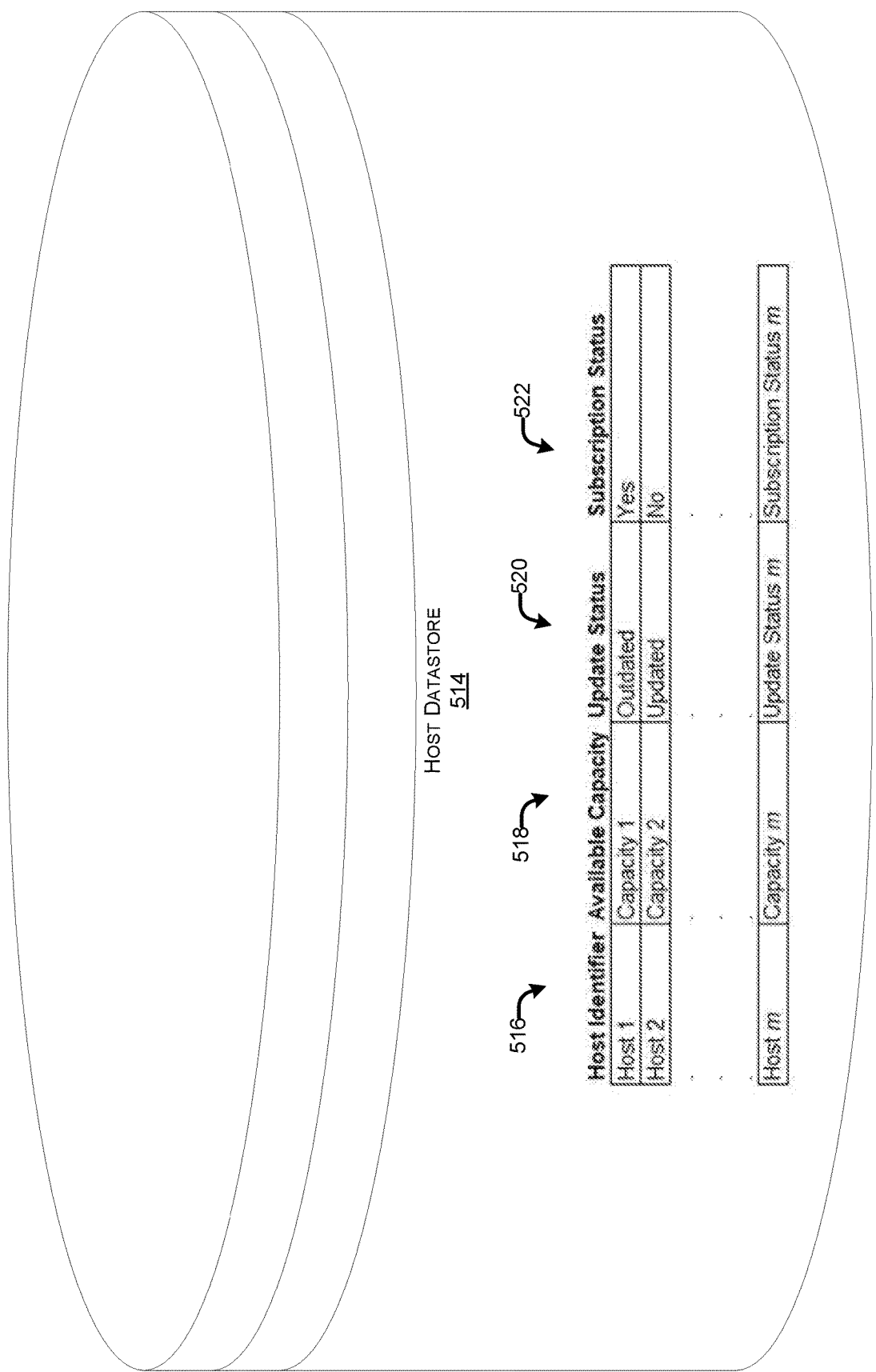
FIG. 5B illustrates an example of a host datastore, which can be used to track hosts in one or more data centers.

FIG. 5B illustrates an example of a host datastore 514. In various implementations, the host datastore 514 can be a database stored locally in and/or accessed by an orchestrator, such as the orchestrator 116 described above with reference to FIGS. 1 to 3. In some examples, the host datastore 514 can be at least part of the datastore(s) 118 described above with reference to FIG. 1.

The host datastore 514 can include m entries corresponding to various virtualized resources hosted in at least one data center (e.g., the data center(s) 102 described above with reference to FIG. 1), wherein m is a positive integer. Each entry can include a variety of fields, such as a host identifier field 516, an available capacity field 518, an update status field 520, and a subscription status field 522.

The host identifier field 516 may specify the host corresponding to each entry. In some cases, the host identifier field 516 may include an IP address of the host, a host ID of the host, or the like. As illustrated in FIG. 5B, host corresponding to "Host 1" to "Host m" are represented in the host datastore 514.

The available capacity field 518 may specify an amount of resources that are available and/or unused in the corresponding host. In some cases, the available and/or unused resources can be used to host a virtualized resource. In some cases, the available capacity field 518 may be specified in terms of available bandwidth, available memory space, available processing capabilities, or the like, of the corresponding host. For example, "Host 1" may have an available capacity of "Capacity 1," and "Host 2" may have an available capacity of "Capacity 2."

The update status field 520 may specify whether the corresponding host is in need of an update. The update status field 520 may be based on whether an update is available for at least one component in the corresponding host, whether the corresponding host was last updated before or during a threshold time (e.g., one month ago), or the like. As illustrated in FIG. 5B, "Host 1" may be "Outdated," whereas "Host 2" may be "Updated." For instance, a software update to a software component on "Host 1" may be available, whereas a software component on "Host 2" may have been previously updated with the software update.

The subscription status field 522 may specify whether the corresponding host is flagged for an update. In various implementations, only a portion of hosts within the data center(s) may be flagged for updates at a given time, in order to limit the impact of reboot migration on infrastructure within the data center(s) at the given time. For example, no more than 10%, 20%, 30%, or some other percentage of hosts may be flagged for updates at a particular time. As illustrated in FIG. 5B, "Host 1" may be subscribed and/or flagged for an update, whereas "Host 2" may not be flagged for an update. The subscription status field 522 may be updated over time. For instance, in response to identifying that "Host 1" has been updated, the subscription status field 522 corresponding to "Host 1" may be changed to "No" and the subscription status field 522 corresponding to "Host 2" may be changed to "Yes."

According to various implementations of the present disclosure, the host datastore 514 may be used to identify whether a rebooting virtualized resource should be migrated from a particular host. In some instances, the orchestrator may selectively migrate virtualized resources from hosts whose update status fields 520 indicate that the hosts are "Outdated." In some cases, the orchestrator may selectively migrate virtualized resources from hosts whose subscription status fields 522 indicate that the hosts are flagged and/or subscribed for an update.

In various examples, the host datastore 514 may be used to select a host as a destination for a migrating virtualized resource. For instance, the orchestrator may select a particular host as a destination for a virtualized resource when the available capacity field 518 of the particular host is at least the size of the virtualized resource. In some cases, the orchestrator may select a particular host as a destination for a virtualized resource when the update status field 520 of the particular host indicates that the particular host is "Updated."

Figure 6:
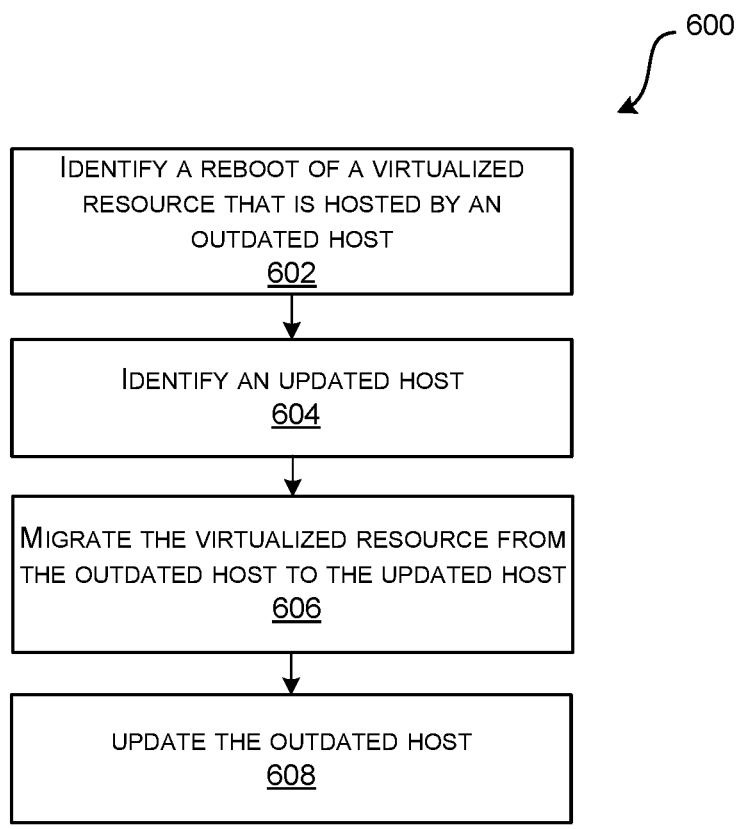
FIG. 6 illustrates an example process for updating an outdated host using reboot migration.
Figure 7:
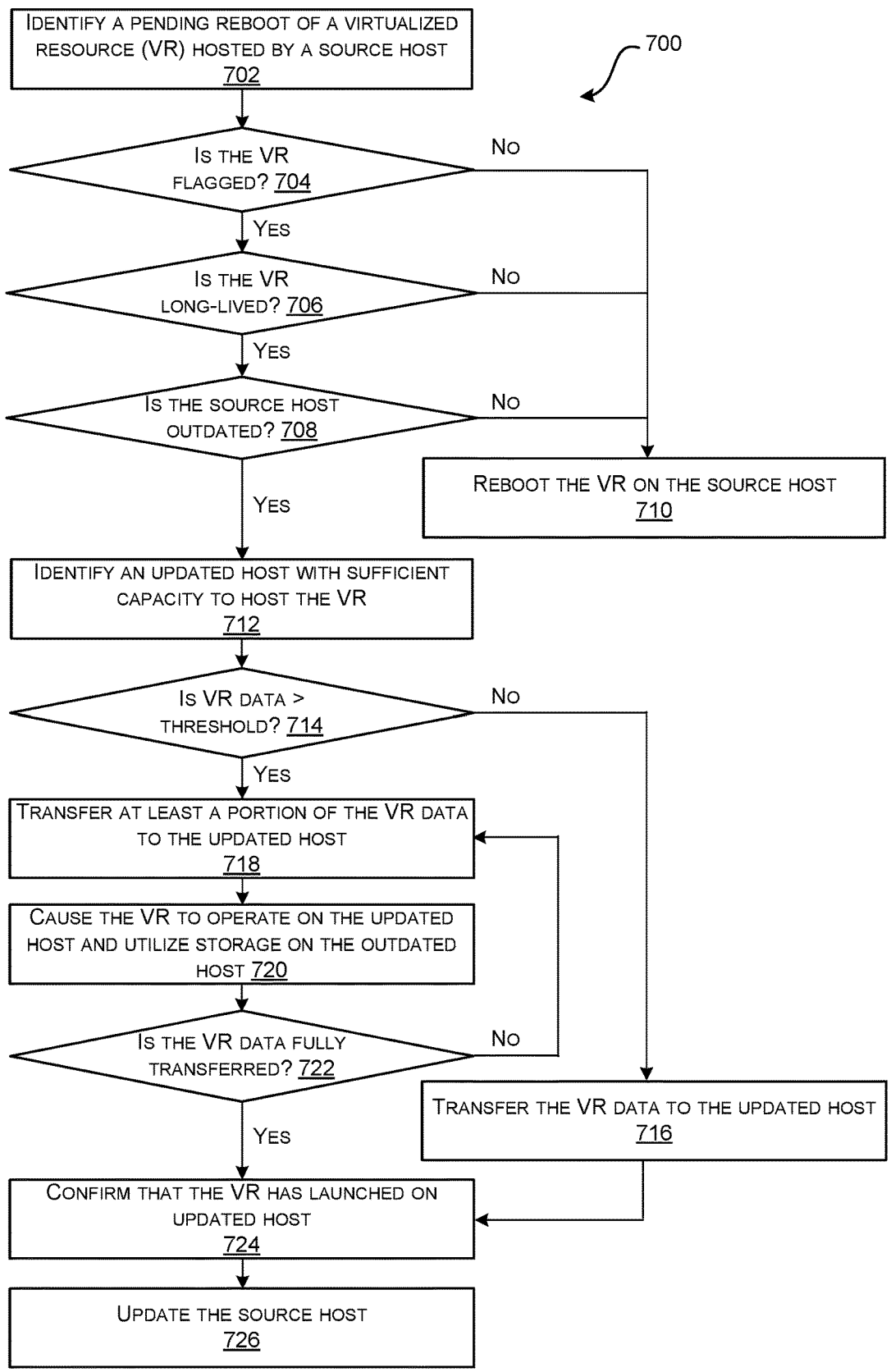
FIG. 7 illustrates an example process for updating an outdated host using reboot migration.

FIGS. 6 and 7 illustrate example processes according to various implementations of the present disclosure. Although the processes may be illustrated in a particular order, in various examples, the processes can be performed in various different orders without departing from the scope of this disclosure.

FIG. 6 illustrates an example process 600 for updating an outdated host using reboot migration. In various implementations, the process 600 can be performed by an orchestrator (e.g., the orchestrator 116 described above with reference to FIGS. 1 to 3) and/or an update manager (e.g., the update manager 120 described above with reference to FIGS. 1 and 3).

At 602, a reboot of a virtualized resource may be identified. The virtualized resource may be hosted by an outdated host. The reboot may be triggered but may not yet be executed at 602. That is, the reboot can be at least temporarily held by the entity performing the process 600 and/or the outdated host itself. In various implementations, an indication of the reboot may be received from the outdated host. For instance, the outdated host may be configured to automatically intercept a pending reboot of the virtualized resource and transmit, to the entity performing the process 600, an indication that the reboot has been requested by a user, that a reboot has been triggered due to a software crash at the outdated host, or the like. In some cases, an indication of the reboot may be received from a controller handling control plane signaling in a data center in which the outdated host is located.

At 604, an updated host may be identified. In some cases, the updated host may be identified at 604 prior to the reboot being identified at 602. In various implementations, the updated host may have sufficient available capacity to host the virtualized resource. For instance, the updated host may be identified from a datastore listing multiple hosts within the same data center of the outdated host, or a different data center. The datastore may indicate that the updated host has been recently updated and/or that there are no available updates for the updated host. The datastore may indicate that the updated host includes at least enough available capacity to accommodate the virtualized resource.

At 606, the virtualized resource may be migrated from the outdated host to the updated host. For instance, an instruction to transfer data associated with the virtualized resource may be transmitted to the outdated host. The instruction may be to transfer the data to the updated host. In some cases, the data may be transferred through the entity performing the process 600, via a peer-to-peer connection between the outdated host and the updated host, or a combination thereof.

At 608, the outdated host may be updated. In various implementations, data associated with updating at least one software-based component of the outdated host may be transmitted to the updated host. In some cases, an instruction to perform an update may be transmitted to the outdated host. In certain implementations, an instruction to replace a component (e.g., a hardware, such as a CPU, RAM, or the like) of the updated host may be output on a user interface. Accordingly, the outdated host may be updated without interfering in the expected operations of the virtualized resource.

FIG. 7 illustrates an example process 700 for updating an outdated host using reboot migration. In various implementations, the process 700 can be performed by an orchestrator (e.g., the orchestrator 116 described above with reference to FIGS. 1 to 3) and/or an update manager (e.g., the update manager 120 described above with reference to FIGS. 1 and 3).

At 702, a pending reboot of a virtualized resource may be identified. The virtualized resource may be hosted by a source host. In various implementations, a request for the reboot may be received from a user device that is external to a data network in which the outdated host is present. In some cases, the request may be received from a controller associated with the data center. According to some examples, the reboot may be triggered automatically on the source host, e.g., due to a system crash. In various cases, the source host may provide an indication of the pending reboot to the entity performing the process 700.

At 704, the process 700 includes determining whether the virtualized resource is flagged. In various implementations, only a portion of virtualized resources hosted by the data center(s) may be flagged for migration at a particular time, in order to prevent virtualized resource migrations from significantly impacting network services (e.g., from occupying an inordinate amount of bandwidth of communication interfaces within the data center(s)).

If the virtualized resource is flagged at 704, the process 700 may continue to 706. At 706, the process 700 may include identifying whether the virtualized resource is a relatively long-lived virtualized resource virtualized resource. The virtualized resource may be a long-lived virtualized resource if an expected lifetime of the virtualized resource is greater than a threshold time period. In some cases, a long-lived virtualized resource may be relatively unlikely to be rebooted and/or migrated within a predetermined future time period. For instance, the virtualized resource may be a long-lived virtualized resource if its last reboot occurred more than a predetermined time period ago, if its reboot frequency has historically been less than a predetermined frequency within a predetermined time period, or the like.

If the virtualized resource is determined to be a long-lived virtualized resource at 706, the process 700 may continue to 708. At 708, the process 700 may include determining whether the source host is outdated. For example, the source host may have at least one component with an available update, at least one component that has last updated before or during a threshold time, or the like. An updated component may be software of the source host, firmware of the source host, hardware of the source host, or a combination thereof.

If the virtualized resource is determined to not be flagged at 704, is determined to not be a long-lived virtualized resource at 706, or the source host is determined to not be outdated at 708, the process 700 may continue to 710. At 710, the virtualized resource may be rebooted on the source host. That is, the entity performing the process 700 may refrain from migrating the virtualized resource during the reboot.

If, however, the source host is determined to be outdated at 708, the process 700 may continue to 712. At 712, the process 700 includes identifying an updated host with sufficient capacity to host the virtualized resource. For instance, the updated host may have one or more resources with an available capacity that is sufficient to accommodate the virtualized resource. Although not illustrated in FIG. 7, in various implementations, if a source host with the sufficient capacity to host the virtualized resource is not identified and/or available within the data center(s), the process 700 may proceed to 710.

At 714, the process 700 includes determining whether virtualized resource data is greater than a threshold. The virtualized resource data may include any data stored and/or manipulated by the source host that enables the virtualized resource to operate on the host. The threshold may be predetermined, in some cases. The amount of virtualized resource data may be stored in a datastore that can be accessed by the entity performing the process 700, reported in the request received at 702, or the like.

If the virtualized resource data is determined to be no more than the threshold at 714, the process may continue to 716. At 716, the virtualized resource data may be transferred to the updated host. For instance, if migrating the virtualized resource only requires a minimal amount of data to be transferred, then the data can be completely transferred from the source host to the updated host in a relatively short amount of time. Accordingly, the virtualized resource data can be completely transferred from the source host to the updated host If the virtualized resource data is determined to be greater than the threshold at 714, then the virtualized resource may be run during migration. At 718, at least a portion of the virtualized resource data may be transferred to the updated host. For example, state information associated with the virtualized resource may be transferred to the updated host. In some cases, the portion of the virtualized resource data transferred at 718 may exclude at least a portion of data associated with the virtualized resource that is stored in a local storage of the source host.

At 720, the virtualized resource may be operated on the updated host while utilizing storage on the outdated host. In some cases, the entity performing the process 700 may transmit, to the updated host, an instruction to execute operations of the virtualized resource after a minimal amount of the data (e.g., state information but not data that was stored in a local storage of the source host) associated with the virtualized resource has been received by the updated host. For instance, at least one processing resource of the updated host may perform operations of the virtualized resource. In various implementations, a portion of the virtualized resource data that enables the virtualized resource to run on the updated host may be transferred at 718. However, at least some of the data may remain left behind on the source host as the updated host begins to perform operations of the virtualized resource. For example, the source host may continue to store at least a portion of the data associated with the virtualized resource that is stored in a memory resource of the source host (e.g., a local storage), on behalf of the virtualized resource, during the transfer of the virtualized resource data to the updated host. Accordingly, access requests for the data that remains left behind on the source host may be at least temporarily routed through the data center(s) (e.g., via the entity performing the process 700) to the source host, even though the virtualized resource is at least partially operating on the updated host. Accordingly, the virtualized resource may operate on both the source host and the updated host as the virtualized resource data is transferred from the source host to the updated host.

At 722, the process 700 may include determining whether the virtualized resource data has been fully transferred. For example, the source host and/or the updated host may transmit, to the entity performing the process 700, at least one confirmation that the virtualized resource data has been fully transferred to the updated host. If the virtualized resource data is determined to not be fully transferred at 722, the process 700 can return to 718. If, however, the virtualized resource data is determined to be fully transferred at 722, or the virtualized resource data was transferred to the updated host at 716, then the process 700 continues to 724. At 724, the virtualized resource is run exclusively on the updated host.

At 726, the source host is updated. In various implementations, once the virtualized resource is vacated from the source host, the source host may be unoccupied of any virtualized resources. That is, the virtualized resource migrated using the process 700 may be the last virtualized resource hosted by the source host. Accordingly, one or more outdated components of the source host may be updated without interrupting the operation of virtualized resources in the data center(s).

In some implementations, a host can determine to implement an opportunistic clearing workflow by iterating through one or both of processes 600 and 700 until all virtualized resources have been cleared, or until some critical time is reached. For example, a host can receive update information indicating that it is outdated with respect to a hardware or software component. The update information can also indicate a priority or time sensitivity of the required update, in some embodiments, which may be used to determine whether to notify customers that their resource usage will be interrupted for maintenance migration (in the case of urgent updates), or whether to implement the opportunistic clearing workflow. Priority and time sensitivity can be determined in various ways in different implementations, for example based on determining that a required deadline for the update is more than a threshold amount of time in the future, based on the nature of the update (e.g., some security updates may require immediate remediation), and/or based on a predicted likelihood (e.g., based on instance lifetime predictions) that the opportunistic clearing workflow will move at least a certain minimum threshold number or percentage of the virtualized resources of the host. These thresholds can be set based on balancing design considerations such as how long is an acceptable wait to perform an update, and what the potential negative customer impact would be should maintenance notifications be sent out (e.g., have any of the customers that have resources on the host received a maintenance migration notification for this or other resources in the last day, week, month, or other timeframe). When a host does determine to implement an opportunistic clearing workflow, the host may monitor its virtualized resources for reboot events that occur independently of the required maintenance (e.g., that are initiated independently of any customer maintenance migration notification), and may opportunistically move as many virtualized resources as possible until (by intercepting the reboot to initiate a migration workflow) either the host is cleared of virtualized resources, or a critical time is reached when any remaining customers must be notified of a required maintenance migration.

Figure 8:
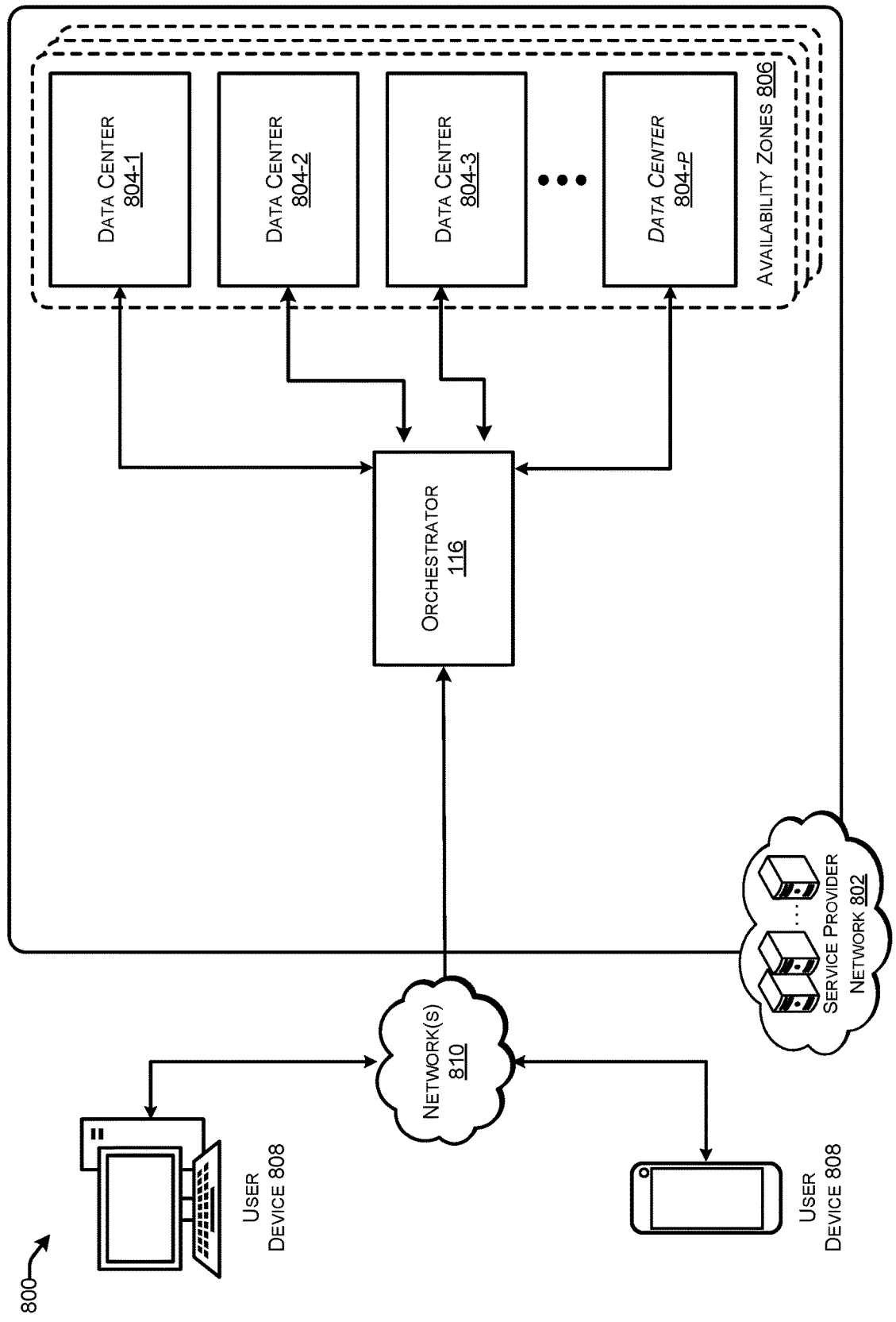
FIG. 8 is a system and network diagram showing an illustrative operating environment that includes a service provider network, which can be configured to implement aspects of various functionalities described herein.

FIG. 8 is a system and network diagram showing an illustrative operating environment 800 that includes a service provider network 802, which can be configured to implement aspects of various functionalities described herein. The service provider network 802 can provide computing resources, like Virtual Machine (VM) instances and storage, on a permanent or an as-needed basis.

Among other types of functionality, the computing resources provided by the service provider network 802 may be utilized to implement various services described above. For instance, the computing resources provided by the service provider network 802 can include various types of computing resources, such as data processing resources like VM instances, data storage resources, networking resources, data communication resources, network services, and the like. In some cases, the computing resources are provided via servers within the service provider network 802.

Each type of computing resource provided by the service provider network 802 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, and/or other types of programs. Data storage resources can include file storage devices, block storage devices, and the like. The service provider network 802 can also be configured to provide other types of computing resources not mentioned specifically herein.

The computing resources provided by the service provider network 802 may be enabled in some implementations by one or more data centers 804-1 to 804-p, wherein p is a positive integer. The data center(s) 804-1 to 804-p might be referred to herein singularly as "a data center 804" or in the plural as "the data centers 804"). The data centers 804 are facilities utilized to house and operate computer systems and associated components. The data centers 804 can include redundant and backup power, communications, cooling, and security systems. The data centers 804 can also be located in geographically disparate locations, or regions. One region may include multiple availability zones 806. A region can be defined as a geographical area in which the cloud provider network 802 clusters data centers 804. Each region can include two or more availability zones 806 connected to one another via a private high-speed network, for example a fiber communication connection. An availability zone can refer to an isolated failure domain including one or more data center facilities with separate power, separate networking, and separate cooling from those in another availability zone. In some cases, availability zones 806 within a region may be positioned far enough away from one other that the same natural disaster should not take more than one availability zone 806 offline at the same time. One illustrative embodiment for a data center 804 that can be utilized to implement the technologies disclosed herein will be described below with regard to FIG. 9.

Various user devices 808 that utilize the service provider network 802 may access the computing resources provided by the service provider network 802 over any wired and/or wireless network(s) 810, which can be a Wide Area Network (WAN), such as the Internet, an intranet or an Internet Service Provider (ISP) network or a combination of such networks. In some cases, network(s) 810 may include a cloud-based network. In some examples, without limitation, a user device 808 operated by a client of the service provider network 802 may be utilized to access the service provider network 802 by way of the network(s) 810. It should be appreciated that a Local Area Network (LAN), the Internet, or any other networking topology known in the art that connects the data centers 804 to remote clients and other users can be utilized. It should also be appreciated that combinations of such networks can also be utilized.

In particular implementations, the user device 808 may utilize resources of a host in a first data center 804-1 among the data centers 804 via a virtualized resource hosted on the host. The orchestrator 116 may identify a request to reboot the virtualized resource. In response, the orchestrator 116 may identify a destination host in the same data center 804-1 or in a different data center 804 within the same availability zone 806 as the first data center 804-1. For instance, the destination host may be in a second data center 804-2. The orchestrator 116 may cause the virtualized resource to migrate from the original host to the destination host. In some cases, the orchestrator can confirm that the destination host can reserve sufficient capacity to host the virtualized resource, prior to causing migration of the virtualized resource. In some cases, the orchestrator 116 may further facilitate an update of the source host, in response to causing the virtualized resource to migrate to the destination host.

In some cases, although not specifically illustrated in FIG. 8, at least a portion of the orchestrator 116 can be hosted by one or more of the data centers 804. For instance, the orchestrator 116 may be hosted by one of the data centers 1004 in relatively close geographical proximity to the user device 808. In some cases, the orchestrator 116 may be configured to migrate multiple virtualized resources between multiple servers in the same availability zone 806 and may be hosted by one of the data centers 1004 in the same availability zone 806 as the servers.

Figure 9:
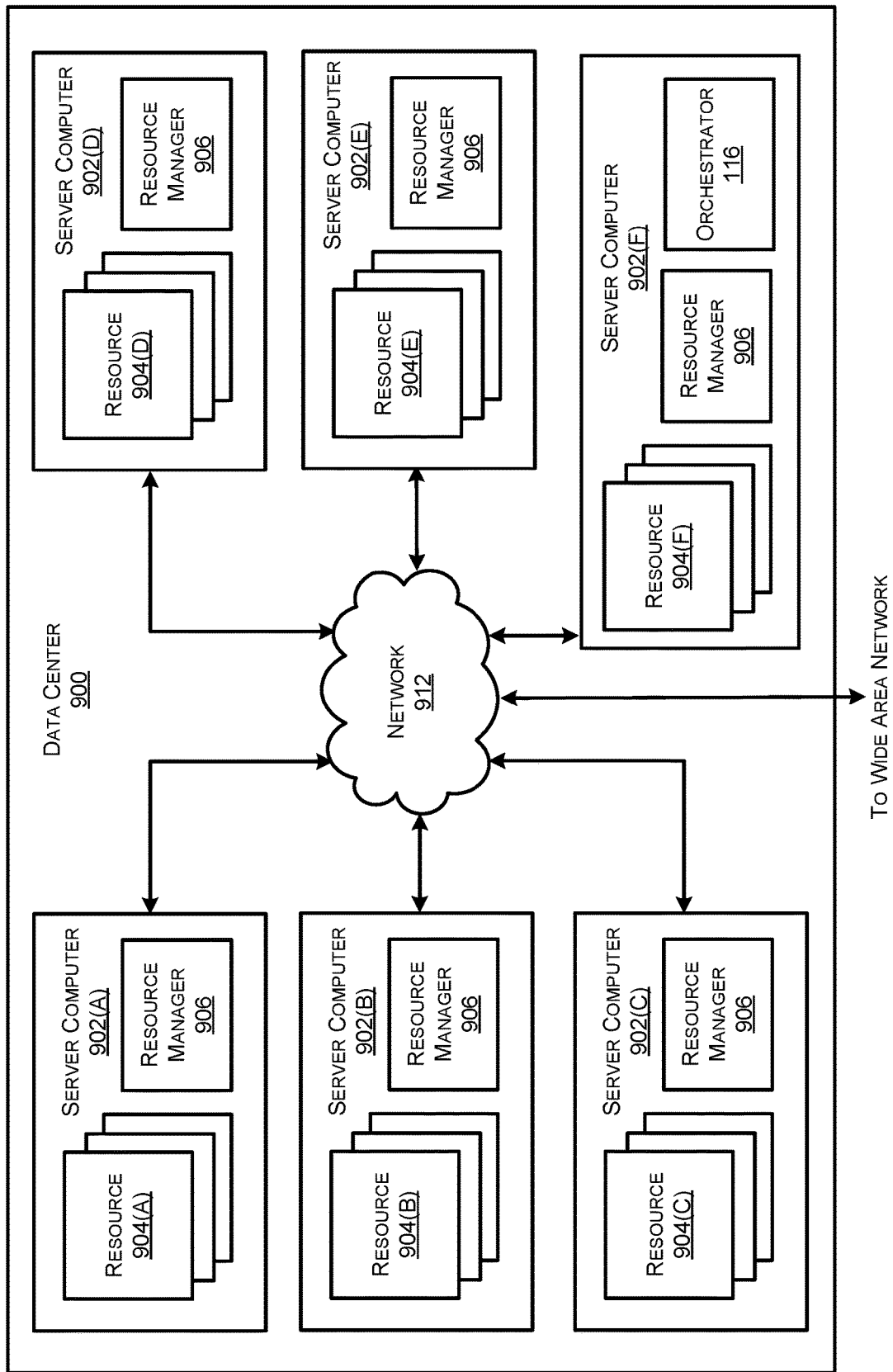
FIG. 9 is a computing system diagram illustrating a configuration for a data center that can be utilized to implement aspects of the technologies disclosed herein.

FIG. 9 is a computing system diagram illustrating a configuration for a data center 900 that can be utilized to implement aspects of the technologies disclosed herein. The example data center 900 shown in FIG. 9 includes several server computers 902(A)-902(F) (which might be referred to herein singularly as "a server computer 902" or in the plural as "the server computers 902") for providing computing resources 904(A)-904(F). In some examples, the resources 904 and/or server computers 902 may include, be included in, or correspond to, the computing resource network 802 described above with reference to FIG. 8.

The server computers 902 can be standard tower, rack-mount, or blade server computers configured appropriately for providing the computing resources described herein (illustrated in FIG. 9 as the computing resources 904(A)-904(F)). As mentioned above, the computing resources provided by the service provider network 802 can be data processing resources such as Virtual Machine (VM) instances or hardware computing systems, database clusters, computing clusters, storage clusters, data storage resources, database resources, networking resources, and others. Server computers 902 in the data center 900 can also be configured to provide network services and other types of services.

The server computers 902 (i.e., server computers 902(A)-902(F)) can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902.

At least one of the servers 902 (i.e., server computer 902(F)) may further execute an orchestrator 116. The orchestrator 116 may manage restarts and/or migration of virtualized resources between servers 902 within the data center 900.

In the example data center 900 shown in FIG. 9, an appropriate network 912 is also utilized to interconnect the server computers 902(A)-902(F). It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 804-1 to 804-p (described above with reference to FIG. 8), between each of the server computers 902(A)-902(F) in the data center 900. It should be appreciated that the configuration of the data center 900 described with reference to FIG. 9 is merely illustrative and that other implementations can be utilized.

Server computer 902(F) can execute some or all of the software components described above. For example, and without limitation, the server computer 902(F) can implement the orchestrator 116. The server computer 902(F) can also be configured to execute other components and/or to store data (e.g., datastore(s) 118) for providing some or all of the functionality described herein. In this regard, it should be appreciated that the services illustrated in FIG. 9 as executing on the server computer 902(F) can execute on many other physical or virtual servers in the data centers 804 in various embodiments.

Figure 10:
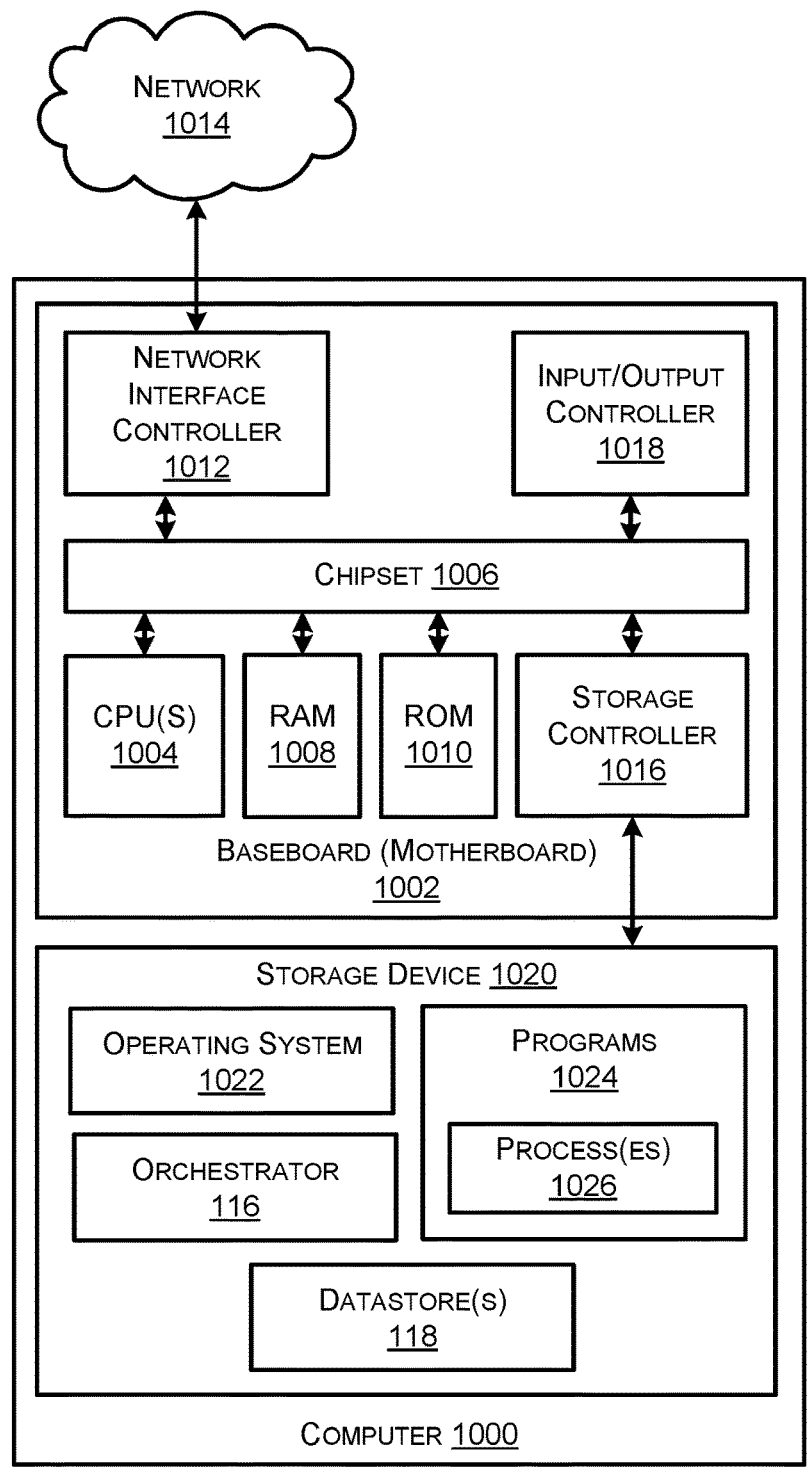
FIG. 10 is a computer architecture diagram showing an illustrative computer hardware architecture for implementing a computing device that can be utilized to implement aspects of the various technologies presented herein.

FIG. 10 is a computer architecture diagram showing an illustrative computer hardware architecture for implementing a computing device that can be utilized to implement aspects of the various technologies presented herein. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more Central Processing Units (CPUs) 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a Read-Only Memory (ROM) 1010 or Non-Volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network 1014. In various implementations, the network 1014 can include at least one of a cloud-based network, a Local Area Network (LAN), or a Wide Area Network (WAN). The chipset 1006 can include functionality for providing network connectivity through a Network Interface Controller (NIC) 1012, such as a gigabit Ethernet adapter. The NIC 1012 is capable of connecting the computer 1000 to other computing devices over the network 1014. It should be appreciated that multiple NICs 1012 can be present in the computer 1000, connecting the computer 1000 to other types of networks and remote computer systems.

The computer 1000 can also include one or more input/output controllers 1018 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device.

The computer 1000 can include and/or be connected to a mass storage device 1020 that provides non-volatile storage for the computer. The mass storage device 1020 can store an operating system 1022, programs 1024 (e.g., processes 1026), as well as the orchestrator 116, datastore(s) 118, and data (e.g., data associated with a virtualized resource), which have been described in greater detail herein. The mass storage device 1020 can be connected to the computer 1000 through a storage controller 1016 connected to the chipset 1006. The mass storage device 1020 can consist of one or more physical storage units. The storage controller 1016 can interface with the physical storage units through a Serial Attached SCSI (SAS) interface, a Serial Advanced Technology Attachment (SATA) interface, a Fiber Channel (FC) interface, or other type of interface for physically connecting and transferring data between computers and physical storage units.

The computer 1000 can store data on the mass storage device 1020 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1020 is characterized as primary or secondary storage, and the like.

For example, the computer 1000 can store information to the mass storage device 1020 by issuing instructions through the storage controller 1016 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1020 by detecting the physical states or characteristics of one or more particular locations within the physical storage units.

In addition to the mass storage device 1020 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the service provider network 802 described above with reference to FIG. 8, and or any components included therein, may be supported by one or more devices similar to computer 1000. Stated otherwise, some or all of the operations performed by the service provider network 802, and or any components included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, Erasable Programmable ROM (EPROM), Electrically-Erasable Programmable ROM (EEPROM), flash memory or other solid-state memory technology, Compact Disc ROM (CD-ROM), Digital Versatile Disk (DVD), High Definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1020 can store an operating system 1022 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1020 can store other system or application programs and data utilized by the computer 1000.

In one embodiment, the mass storage device 1020 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1 to 7. The computer 1000 can also include computer-readable storage media having instructions stored thereupon for performing any of the other computer-implemented operations described herein.

It will be appreciated that the computer 1000 might not include all of the components shown in FIG. 10, can include other components that are not explicitly shown in FIG. 10, or might utilize an architecture completely different than that shown in FIG. 10.

Further, in some implementations, the computer 1000 may correspond to a server configured to host one or more virtualized resources at a time. In some examples in which the computer 1000 is hosting a virtualized resource, the orchestrator 116 and/or datastore(s) 118 may be omitted from the computer 1000. In some cases in which the computer 1000 is a sever currently hosting a virtualized resource, data associated with the virtualized resource may be stored in the storage device 1020. Other architectures may be used to implement the described functionalities and are also intended to be within the scope of this disclosure. Furthermore, although specific distributions of responsibilities are defined above for purposes of discussion, the various functions and responsibilities might be distributed and divided in different ways, depending on circumstances.

The environments and individual elements described herein may of course include many other logical, programmatic, and physical components, of which those shown in the accompanying figures are merely examples that are related to the discussion herein.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
memory storing computer-executable instructions that, when executed, cause the one or more processors to perform operations comprising:
determining that a source server is outdated with respect to at least one hardware or software component;
determining to implement an opportunistic clearing workflow by monitoring virtual machines hosted by the source server for reboot events triggered independently of any maintenance notification;
identifying that a reboot of a virtualized machine of the virtual machines hosted by the source server has been triggered independently of any maintenance notification, wherein the reboot is either requested by a user associated with the virtual machine, initiated by the virtual machine, or initiated by a hypervisor running the virtual machine on the source server;
identifying, among multiple other servers, a destination server with at least one of a memory resource or a processing resource comprising a sufficient available capacity to accommodate the virtual machine;
determining that the destination server is not outdated with respect to the at least one hardware or software component;
in response to determining that the destination server is not outdated, causing the source server to transfer data associated with the virtual machine to the destination server;
determining that the source server is unoccupied with any other virtual machines; and
in response to determining that the source server is unoccupied, causing the source server to be updated with respect to the at least one hardware or software component.

2. The system of claim 1, wherein the reboot is a first reboot, and wherein the operations further comprise:
determining that the virtual machine is hosted by the destination server;
in response to determining that the virtual machine is hosted by the destination server, determining that a second reboot of the virtual machine has been requested by the user; and
causing the virtual machine to be rebooted on the destination server without causing the virtual machine to be migrated.

3. The system of claim 1, wherein the virtual machine is a first virtual machine, the reboot is a first reboot, and the user is a first user, and wherein the operations further comprise:
determining that a second reboot of a second virtual machine hosted by the source server has been requested by a second user associated with the second virtual machine;
determining that a predicted lifetime of the second virtual machine is less than a threshold amount of time; and
in response to determining that the predicted lifetime of the second virtual machine is less than the threshold amount of time, causing the second virtual machine to be rebooted on the source server.

4. The system of claim 1, wherein the operations further comprise:
identifying a remaining virtual machine running on the source server;
determining that a predicted lifetime of the remaining virtual machine extends beyond a required point in time at which the at least one hardware or software component must be updated;
notifying a user associated with the remaining virtual machine that the virtual machine will be interrupted for a maintenance migration;

performing the maintenance migration; and
determining that the source server is unoccupied in response to performing the maintenance migration.

5. A method, comprising:
   determining that at least one component of a first host is outdated, the at least one component comprising at least one of hardware or software;
   in response to determining that the at least one component of the first host is outdated:
      determining to initiate an opportunistic clearing workflow to move virtualized resources off of the first host to accommodate an update of the at least one component; and
      identifying a reboot of a virtualized resource occupying the first host;
   in response to identifying the reboot of the virtualized resource, initiating a workflow for migrating the virtualized resource from the first host to a second host by:
      determining that an amount of data associated with the virtualized resource is greater than a threshold amount of data;
      causing the first host to transmit, to the second host, a first portion of the data associated with the virtualized resource;
      in response to causing the first host to transmit the first portion, causing the virtualized resource to operate using at least one processing resource of the second host; and
      in response to causing the virtualized resource to operate using the at least one processing resource, causing the first host to transmit, to the second host, a second portion of the data associated with the virtualized resource; and
   in response to initiating the workflow for migrating the virtualized resource, causing the first host to update the at least one component.

6. The method of claim 5, wherein determining that the at least one component of the first host is outdated comprises determining that the first host is running a first version of the software, and wherein causing the first host to update the at least one component comprises transmitting, to the first host, data comprising a second version of the software, and
   wherein the virtualized resource is different than the software.

7. The method of claim 5, wherein determining that the at least one component is outdated comprises:
   determining an identity of the first host; and
   identifying an entry in a datastore corresponding to the first host, the entry indicating that an update to the at least one component is available.

8. The method of claim 5, wherein migrating the virtualized resource to the second host is performed without notifying a user associated with the virtualized resource of maintenance downtime for updating the at least one component.

9. The method of claim 5, wherein the method further comprises:
   in response to initiating the workflow for migrating the virtualized resource to the second host, determining that the first host is unoccupied, and
   wherein updating the at least one component is in response to determining that the first host is unoccupied.

10. The method of claim 5, wherein the at least one component is at least one first component, the method further comprising:
    identifying an entry in a database indicating that at least one second component of a third host is fully updated; and
    identifying the third host as the second host.

11. The method of claim 5, further comprising:
    determining an expected lifetime of the virtualized resource based at least partly on a time period between previous reboots of the virtualized resource;
    determining that the expected lifetime of the virtualized resource is greater than a threshold time period.

12. The method of claim 5, wherein causing the first host to update the at least one component comprises:
    transmitting, to the first host, update data associated with updating the at least one component; and
    transmitting, to the first host, an instruction to update the at least one component.

13. A system, comprising:
    one or more processors; and
    memory storing computer-executable instructions that, when executed, cause the one or more processors to perform operations comprising:
       determining that at least one component of a first host is outdated;
       in response to determining that the at least one component of the first host is outdated:
          determining to initiate an opportunistic clearing workflow to intercept any reboots of virtualized resources running on the first host; and
          identifying a request to reboot a virtualized resource occupying the first host;
       in response to identifying the request, intercepting the reboot by initiating a migration workflow to cause the first host to transfer data associated with the virtualized resource to a second host; and
       in response to determining that all of the virtualized resources have been migrated off of the first host, causing the first host to update the at least one component by:
          transmitting, to the first host, data associated with updating the at least one component; and
          transmitting, to the first host, an instruction to update the at least one component.

14. The system of claim 13, wherein determining that the at least one component of the first host is outdated comprises determining that the first host is running a first version of software, and wherein causing the first host to update the at least one component comprises transmitting, to the first host, data comprising a second version of the software, and
    wherein the virtualized resource is different than the software.

15. The system of claim 13, wherein determining that the at least one component is outdated comprises:
    determining an identity of the first host based at least in part on the request; and
    identifying an entry in a datastore corresponding to the first host, the entry indicating that an update to the at least one component is available.

16. The system of claim 13, wherein all of the virtualized resources comprise a second virtualized resource, and wherein the operations further comprise:
    determining that a predicted lifetime of the second virtualized resource extends beyond a threshold point of time;
    notifying a user associated with the second virtualized resource that the second virtualized resource will be interrupted for a maintenance migration; and causing the first host to migrate the second virtualized resource to a third host,
wherein determining that all of the virtualized resources have been migrated off of the first host is in response to causing the first host to migrate the second virtualized resource.

17. The system of claim 13, wherein the operations further comprise:
in response to causing the first host to transfer the data, determining that the first host is unoccupied,
wherein updating the at least one component is in response to determining that the first host is unoccupied.

18. The system of claim 13, wherein the at least one component is at least one first component, the operations further comprising:
identifying an entry in a database indicating that at least one second component of a third host is fully updated; and
identifying the third host as the second host.

19. The system of claim 13, wherein migrating the virtualized resource to the second host comprises:
determining that an amount of the data associated with the virtualized resource is greater than a threshold amount of data;
causing the first host to transmit, to the second host, a first portion of the data associated with the virtualized resource;
in response to causing the first host to transmit the first portion, causing the virtualized resource to operate using at least one processing resource of the second host; and
in response to causing the virtualized resource to operate using the at least one processing resource, causing the first host to transmit, to the second host, a second portion of data associated with the virtualized resource.

20. The system of claim 13, wherein the operations further comprise:
determining an expected lifetime of the virtualized resource based at least in part on a time period between previous reboots of the virtualized resource; and
determining that the expected lifetime of the virtualized resource is greater than a threshold time period.

* * * * *